United States Patent
Mitsuyasu et al.

(10) Patent No.: US 7,378,804 B2
(45) Date of Patent: May 27, 2008

(54) BALLAST FOR A DISCHARGE LAMP WITH INTEGRATED CONTROL CIRCUIT FOR CONTROLLING SWITCHING ELEMENT OF DC POWER SUPPLY AND INVERTER CIRCUIT

(75) Inventors: Kei Mitsuyasu, Osaka (JP); Katsumi Sato, Hirakata (JP); Katsunobu Hamamoto, Nayagawa (JP); Masahiro Yamanaka, Otsu (JP); Yoshifumi Kuroki, Nishikanbara-gun (JP)

(73) Assignee: Matsushita Electric Works, Ltd., Osaka (JP)

( * ) Notice: Subject to any disclaimer, the term of this patent is extended or adjusted under 35 U.S.C. 154(b) by 475 days.

(21) Appl. No.: 10/499,674

(22) PCT Filed: Dec. 26, 2002

(86) PCT No.: PCT/JP02/13614

§ 371 (c)(1),
(2), (4) Date: Jun. 22, 2004

(87) PCT Pub. No.: WO03/059021

PCT Pub. Date: Jul. 17, 2003

(65) Prior Publication Data

US 2006/0158131 A1    Jul. 20, 2006

(30) Foreign Application Priority Data

Dec. 28, 2001    (JP) ............................. 2001-401532

(51) Int. Cl.
H05B 41/16    (2006.01)

(52) U.S. Cl. .................. 315/247; 315/209 R; 315/224; 315/246; 315/291

(58) Field of Classification Search ................ 315/247, 315/246, 224, 225, 209, 291, 307–311, DIG. 2, 315/DIG. 4, DIG. 5, DIG. 7
See application file for complete search history.

(56) References Cited

U.S. PATENT DOCUMENTS 5,463,287 A * 10/1995 Kurihara et al. ............ 315/307

(Continued)

FOREIGN PATENT DOCUMENTS

JP        05-021175 A1    1/1993

(Continued)

OTHER PUBLICATIONS

International Search Report for PCT/JP02/13614 mailed on Apr. 30, 2003.

(Continued)

*Primary Examiner*—Tuyet Vo
(74) *Attorney, Agent, or Firm*—Cheng Law Group PLLC

(57) ABSTRACT

The ballast of the present invention includes a DC power supply, an inverter circuit, a load circuit, and an integrated control circuit. The integrated control circuit controls the switching elements of the DC power supply and the inverter circuit. The integrated control circuit includes a first control unit, a second control unit, and a driver circuit. The first control unit generates a first control signal for control of the switching element of the DC power supply. The second control unit generates a second control signal for control of the switching elements of the inverter circuit. The driver circuit provides drive signals for driving each one of the switching elements of said DC power supply and the inverter circuit in accordance with the first control signal and the second control signal. As mentioned above, control circuits for controlling the DC power supply and the inverter circuit are integrated into a single component, the number of components which are mounted on a printed circuit board is reduced.

6 Claims, 20 Drawing Sheets

U.S. PATENT DOCUMENTS

| | | | | |
|---|---|---|---|---|
| 5,465,029 | A | * | 11/1995 | Hanazaki et al. ........... 315/308 |
| 5,569,984 | A | * | 10/1996 | Holtslag ..................... 315/307 |
| 6,008,594 | A | * | 12/1999 | Kita et al. .................. 315/307 |
| 6,621,236 | B1 | * | 9/2003 | Kisaichi ..................... 315/224 |

FOREIGN PATENT DOCUMENTS

| | | |
|---|---|---|
| JP | 05-082280 A1 | 4/1993 |
| JP | 05-121180 A1 | 5/1993 |
| JP | 05-144583 A1 | 6/1993 |
| JP | 06-333690 A | 12/1994 |
| JP | 08-180989 A1 | 7/1996 |
| JP | 09-121550 A1 | 5/1997 |
| JP | 09-298095 A1 | 11/1997 |
| JP | 11-008083 A1 | 1/1999 |
| JP | 11-135289 A1 | 5/1999 |
| JP | 11-214189 A1 | 8/1999 |
| JP | 11-238590 A1 | 8/1999 |
| JP | 11-339986 A1 | 12/1999 |
| JP | 2000-012269 A1 | 1/2000 |
| JP | 3106592 B2 | 9/2000 |
| JP | 2000-276935 A | 10/2000 |
| JP | 2001-23780 A | 1/2001 |
| JP | 2001-176686 A1 | 6/2001 |

OTHER PUBLICATIONS

English translation of International Preliminary Examination Report for PCT/JP2002/013614 completed on Jan 16, 2004.

Notification of Reasons for Refusal for the Patent Application No. 2001-401532 from Japan Patent Office, mailed Sep. 11, 2007.

* cited by examiner

US 7,378,804 B2

BALLAST FOR A DISCHARGE LAMP WITH INTEGRATED CONTROL CIRCUIT FOR CONTROLLING SWITCHING ELEMENT OF DC POWER SUPPLY AND INVERTER CIRCUIT

TECHNICAL FIELD

The present invention relates to a ballast for a discharge lamp which turns on a discharge lamp by high frequency power.

BACKGROUND ART

Japanese Patent No. 3106592 discloses a ballast for a discharge lamp which includes a DC power supply and an inverter circuit. The DC power supply receives an input voltage and provides a regulated DC output voltage for the inverter circuit. The inverter circuit converts the DC output voltage into a high frequency voltage to apply it to the discharge lamp for driving the discharge lamp. The DC power supply includes an inductor, a capacitor, and a switching element, and generates a predetermined DC output voltage across a smoothing capacitor by turning on and off the input voltage. The inverter circuit includes two switching elements which are connected in series across the smoothing capacitor, and generates a high frequency voltage by turning on and off the two switching elements alternately. This ballast further includes a first control unit which turns on and off the switching element of the DC power supply so as to keep the DC output voltage at a predetermined value, a second control unit which turns on and off the switching elements of the inverter circuit so as to keep the high frequency voltage from the inverter circuit at a predetermined value or change the high frequency voltage, and a driver circuit which receives a first control signal and a second control signal generated from the first control unit and the second control unit, respectively, and generates a signal for driving the switching elements.

In such a conventional ballast, the first control unit which controls the DC power supply and the second control unit which controls the inverter circuit are formed in separate integrated control circuits and are designed so that each integrated control circuit includes a driver circuit. Therefore, a circuit pattern on a printed circuit board on which these two integrated control circuits are mounted is subjected to a restriction, and mounting positions of the DC power supply and the inverter circuit, especially the switching elements used for these, have a low degree of flexibility, so, it is difficult to miniaturize the ballast circuit.

DISCLOSURE OF THE INVENTION

The present invention has been achieved to solve the above insufficiency, and the object of the present invention is to provide a ballast for a discharge lamp which can be miniaturized. The ballast for a discharge lamp in accordance with the present invention includes a DC power supply, an inverter circuit, a load circuit, and an integrated control circuit. The DC power supply receives an input voltage and provides a regulated DC output voltage. The DC power supply includes a switching element which is driven to turn on and off in a controlled manner to provide the DC output voltage. The inverter circuit converts the DC output voltage into a high frequency voltage. The inverter circuit includes at least one pair of two switching elements which are connected in series across the DC output voltage and are controlled to alternately turn on and off to provide the high frequency voltage. The load circuit receives the high frequency voltage to apply it to the discharge lamp for driving the discharge lamp. The integrated control circuit controls the switching elements of the DC power supply as well as the inverter circuit. The integrated control circuit includes a first control unit, a second control unit, and a driver circuit. The first control unit generates a first control signal for control of the switching element of the DC power supply. The second control unit generates a second control signal for control of the switching elements of the inverter circuit. The driver circuit provides drive signals for driving each one of the switching elements of said DC power supply and the inverter circuit in accordance with the first control signal and the second control signal.

As mentioned above, because control circuits for controlling the DC power supply and the inverter circuit are integrated into a single component, the number of components which are mounted on a printed circuit board is reduced, therefore, a circuit pattern on the printed circuit board is simplified, and, as a result, mounting positions of the DC power supply, the inverter circuit, and the load circuit on a printed circuit board have high degree of flexibility. So, the ballast can be miniaturized.

It is preferable that the DC power supply is a step-up chopper circuit for boosting the input voltage to the DC output voltage. It is also preferable that the load circuit includes an inductor and a capacitor which are cooperative to form a resonant circuit through which the high frequency voltage is applied to the discharge lamp. The integrated control circuit comprises a starter circuit, a first timer, and a selector. The starter circuit provides a controlled power for energizing the first control unit, the second control unit, and the driver circuit. The first timer starts counting time upon energization of the first control unit, the second control unit, and the driver circuit so as to define a preheating time period within which filaments of the discharge lamp are heated, and to define a subsequent lamp-start time period within which a starting voltage is applied to the discharge lamp. The selector, in response to the output from the first timer, varies at least one of a duty ratio of and a switching frequency of the switching elements of the inverter circuit for providing a preheating current to the filaments within the preheating time period and for providing the starting voltage within the lamp-start time period. The circuit which controls the discharge lamp from the preheating until the starting, as mentioned above, is also set in a single integrated control circuit.

Furthermore, it is preferable that the integrated control circuit includes a dimmer control unit. The dimmer control unit receives an external dimming signal and converts it into an internal dimming signal which is fed to the second control unit for varying a lamp output of the discharge lamp. In association with this, the inverter circuit includes a lamp monitor which monitors the lamp operating condition of the discharge lamp and provides a detection signal indicative of the operating condition. In this case, the dimmer control unit comprises a signal converter which converts the external dimming signal into the internal dimming signal, and a comparator unit which compares the internal dimming signal with the detection signal and provides a correction signal reflecting a comparison result to the second control unit. The second control unit, in response to the corrections signal, varies at least one of the duty ratio and the switching frequency of the switching elements of the inverter circuit for dimming the discharge lamp. Therefore, the brightness of the discharge lamp can be varied according to the operating condition of the discharge lamp.

Preferably, the dimmer control unit is kept disabled until said first control unit, said second control unit, and said driving circuit are energized to activate the switching elements of said DC power supply and said inverter circuit. In this case, it is prevented that an excessive stress is added to the circuit elements which constitute the inverter circuit and the load circuit.

Furthermore, it is preferable that the dimmer control unit is kept disabled until the lamp-start time period is ended. In this case, even if the dimmer control unit receives the external dimming signal accidentally during this period, the discharge lamp can start certainly, without being influenced by the external dimming signal.

Furthermore, it is preferable that the ballast of the present invention further includes a lamp monitor which monitors the operating condition of the discharge lamp and provides a monitor signal indicative of the monitored lamp operating condition. In association with this, the integrated control circuit includes a fault discriminator and a first output limiter. The fault discriminator analyzes the monitor signal to determine if it indicates an abnormal condition of the discharge lamp, and provides a fault signal when the abnormal condition continues over a predetermined critical time period. The first output limiter, in response to the fault signal, provides a first limit signal to at least one of the first and second control units, whereby the at least one of the first and second control units acts to reduce or stop providing the output. Therefore, it is prevented that an excessive stress is added to the circuit elements which constitute the inverter circuit and the load circuit by reducing or stopping providing the output to the discharge lamp when the abnormal condition of the discharge lamp is detected.

In this case, it is preferable that the integrated control circuit includes a third timer which defines a restricted time period in which the first output limiter is enabled to keep providing the first limit signal, and the third timer operates to reactivate the first timer after a lapse of the restricted time period so as to give again the preheating time period and the lamp-start time period for restarting the discharge lamp. Therefore, the third timer can try restarting the discharge lamp after the circuit is protected with the detection of the abnormal condition, and, if the abnormal condition has been eliminated, the discharge lamp can restart automatically.

Furthermore, it is preferable that that the preheating time period as well as the lamp-starting time period both defined by the first timer vary in a direct proportion to an environmental temperature, the critical time period defined by the fault discriminator varies in an inverse proportion to the environmental temperature, and the restricted time period defined by the third timer varies in a direct proportion to the environmental temperature. This ensures a proper control of the DC power supply and the inverter circuit and a stable operation of the discharge lamp, even if the environmental temperature has changed with the abnormal condition of the environmental factors or the discharge lamp.

Still furthermore, it is preferable that the ballast of the present invention includes a power output detector unit which detects the output voltage of the DC power supply. Based on this detected output voltage, the first control unit varies the duty ratio of the switching element of the DC power supply by feed back method so as to give a fixed DC output voltage. On the other hand, the power output detector monitors a waveform of a resonant current flowing through one of the inverter circuit and the load circuit, and the fault discriminator analyzes the phase of the waveform to determine the abnormal condition of the discharge lamp. Thus, it is prevented that an excessive stress is added to the circuit elements by leading phase motion of the resonance current produced when the discharge lamp has become the abnormal condition.

Furthermore, the power output detector unit is prepared in the integrated control circuit and provides a first inhibiting signal to the first output limiter as long as the output voltage of the DC power supply is less than a predetermined level to prohibit the first output limiter from issuing the first limit signal. If the input voltage of the inverter circuit drops in a transitional period seen when the DC output voltage of the DC power supply rises, the leading phase motion may arise in the resonance circuit in the load circuit, although the discharge lamp is normal. In such a case, generating the first inhibiting signal can eliminate incorrect detection of the abnormal condition in the transitional period and serve to perform a stable control.

In stead of using the first inhibiting signal, the first output limiter may be prohibited from providing the first limit signal until the preheating time period defined by the first timer has elapsed. In this case, too, incorrect detection of the abnormal condition in the transitional period, seen when the DC output voltage rises, can be eliminated and a stable control can be performed. The first output limiter may be prohibited from providing the first limit signal over a time interval starting from the end of the preheating time interval and ending on or before the lapse of the lamp-starting time period.

The ballast of the present invention may further include a power input monitor which monitors an input voltage being fed to the DC power supply and provides an output indicative of the monitored input voltage. In this case, the integrated control circuit includes a comparator which compares the input voltage with a first threshold and enables the first timer, the first control unit, and the second control unit when the input voltage exceeds the threshold. Generally, outputting a predetermined output when the input voltage to the DC power supply is low causes a big stress to the DC power supply and the switching elements of the inverter circuit. So, disabling the DC power supply and the inverter circuit when the input voltage is low and enabling them when the input voltage has become sufficiently high can protect the circuit elements.

It is preferable that the comparator compares the input voltage to the DC power supply with a second threshold lower than the first threshold and provides a low-voltage indicating signal until the input voltage goes above the first threshold after it goes below the second threshold. The second inhibitor may disable the DC power supply and the inverter circuit when the low-voltage indicating signal continues over a predetermined reference time period. If the input voltage to the DC power supply is a pulsating flow voltage, using the comparator which has a hysteresis characteristic for detecting the input voltage can activate the inverter circuit without being affected by momentary voltage drop, and the discharge lamp can light up stably. However, if the period in which the input voltage continues going below the lower second threshold becomes long, the inverter circuit and the discharge lamp will suffer unnecessary stress. So, in such a case, the second inhibitor disables the DC power supply and the inverter circuit, thereby protecting the ballast and the discharge lamp.

Furthermore, it is preferable that the integrated control circuit includes a second output limiter which provides a second limit signal when the detected output voltage goes below a threshold. The second limit signal causes the second control unit to lower the output of the inverter circuit. The second limit signal from the second output limiter is invalidated during a time period starting from the beginning of the lamp-start time period and ending at a time equal to or earlier than the end of the lamp-start time period. When the output voltage of the DC power supply goes below a predetermined value by some reason, the waveform of the resonance current which flows through the inverter circuit becomes a leading phase, and the switching elements of the inverter circuit will suffer stress. In such a case, lowering the output of the inverter circuit by providing the second output limiter can prevent undesirable stress from generating. In addition, because the second limit signal from the second output limiter is invalidated during the lamp-start time period in which the output power of the DC power supply is comparatively unstable, the discharge lamp can shift certainly from the starting to the stable lightning.

Still furthermore, it is preferable that the integrated control circuit includes fault detecting means which detects an abnormal condition of the discharge lamp. The fault detecting means provides an output limit signal to the first and second control units for limiting the output of the DC power supply and the inverter circuit and provides a release signal to the first and second control units after the fault condition is removed, thereby resuming the DC power supply and the inverter circuit. In this case, it is preferable that the integrated control circuit further includes a delay circuit which, in response to the release signal, delays providing the release signal by a predetermined time to the first and second control units for releasing the output limiting, and provides the release signal first to the second control unit and subsequently to the first control unit. Thus, even if the release signal is outputted accidentally, the abnormal condition of the discharge lamp can be detected immediately after the DC power supply and the inverter circuit have resumed, at which time the voltage supplied to the inverter circuit from the DC power supply is low. Therefore, the abnormal condition can be detected in the state where parts and elements suffer little stress.

It is preferable that the first control unit provides the first control signal which varies the output DC voltage of the DC power supply in an inverse proportion to an environmental temperature, and the second control unit provides the second control signal which varies a high frequency output voltage from said DC power supply in a direct proportion to the environmental temperature.

The integrated control circuit, as well as the DC power supply and the inverter circuit, are mounted on a single printed circuit board, and the switching elements of the DC power supply are arranged close to an output terminal of the driver circuit that outputs the drive signals in response to the first control signal from the first control unit, and the switching elements of the inverter circuit are arranged close to output terminal of the driver circuit that outputs the driving signals in response to the second control signal from the second control unit, and the switching elements of the DC power supply and the inverter circuit are arranged in a side-by-side relation. By this arrangement, the circuit pattern on the printed circuit board is simplified, and generating of noise which leads to incorrect operation can be suppressed, and a plurality of switching elements can be arranged in an optimum pattern. More preferably, a rectangular package which accommodates the integrated control unit has leads on its opposite lateral sides for connection with signal lines on the printed circuit board, and the package is provided at portions adjacent to its opposite longitudinal ends respectively with power input terminals and signal output terminals, and the DC power supply, the integrated control unit, the inverter circuit unit, and the load circuit are arranged in this order along the length of the package.

BEST MODE FOR CARRYING OUT THE INVENTION

Figure 1:
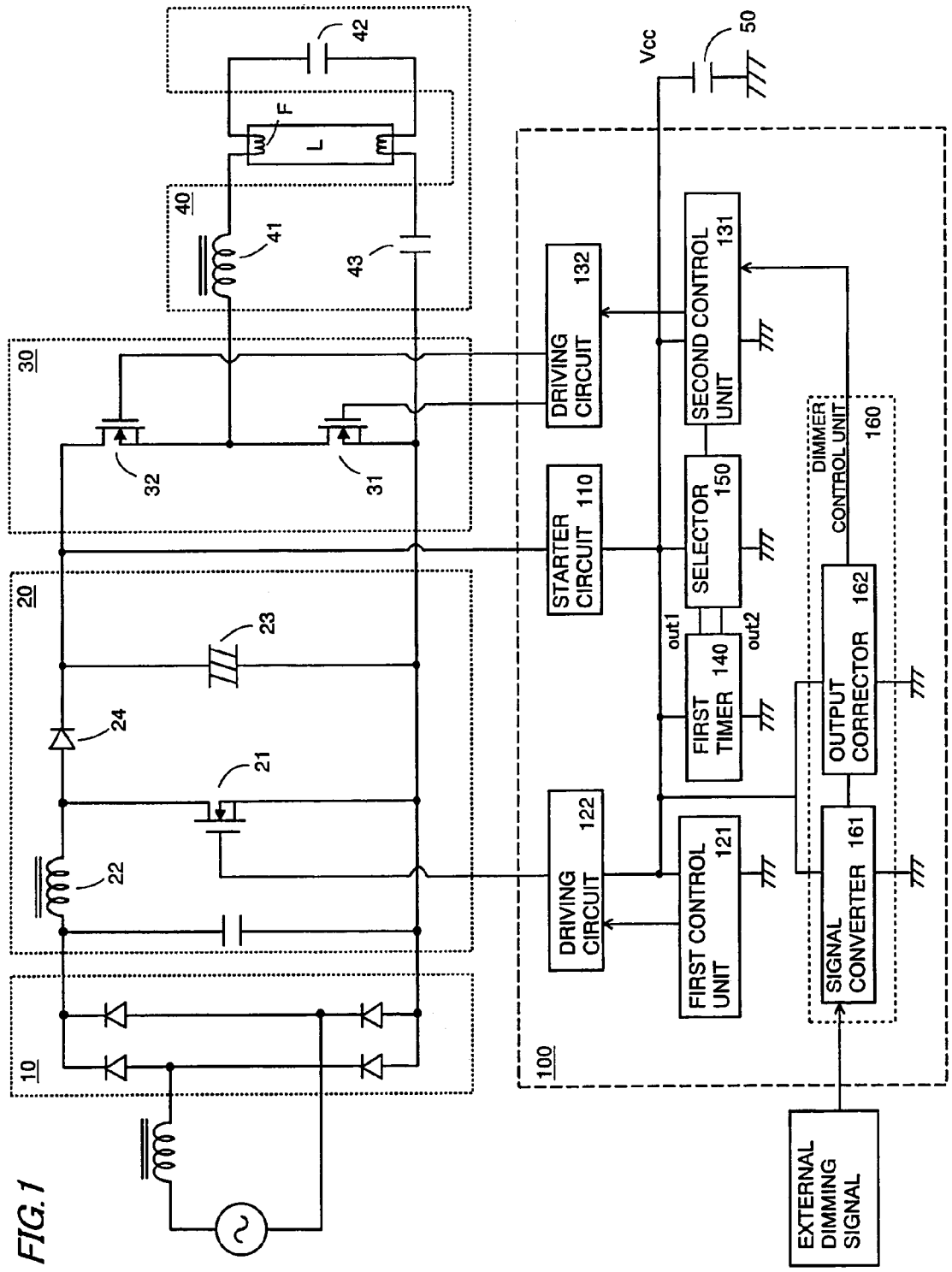
FIG. 1 is a circuit diagram of a ballast for a discharge lamp in accordance with a first embodiment of the present invention.

FIG. 1 shows a ballast for a discharge lamp in accordance with a first embodiment of the present invention. This ballast comprises a rectification circuit 10 which is connected to an AC power supply and provides a rectified DC voltage, a DC power supply 20 which receives the rectified DC voltage and provides a predetermined regulated DC output voltage, an inverter circuit 30 which converts the DC output voltage into a high frequency voltage, and a load circuit 40 which receives the high frequency voltage from the inverter circuit 30 and applies it to a discharge lamp L.

The DC power supply 20 is composed as a step-up chopper circuit which includes a switching element 21, an inductor 22, and a smoothing capacitor 23. The switching element 21 is realized by a MOSFET and is connected in series with the inductor 22 across the rectification circuit 10 and is turned on and off at high frequency to accumulate a smoothed voltage in the smoothing capacitor 23 through a diode 24. A first control signal for turning on and off the switching element 21 is generated by a first control unit 121 provided in an integrated control circuit 100. The first control signal is fed to a driving circuit 122, and is converted into a drive signal, and then is applied to the switching element 21.

The inverter 30 is in the form of a half-bridge inverter circuit which comprises a series circuit of switching elements 31, 32 connected across the smoothing capacitor 23. Each of the switching elements 31, 32 is realized by a MOSFET. The inverter 30 converts the DC output voltage from the DC power supply 20 into a high frequency voltage by turning on and off the switching elements 31, 32 alternately. A second control signal for turning on and off the switching elements 31, 32 is generated by a second control unit 131 provided in the integrated control circuit 100. The second control signal is fed to a driving circuit 132, and is converted into a drive signal, and then is applied to the switching elements 31, 32.

The load circuit 40 is composed of a series circuit which comprises a inductor 41, capacitor 42, and a blocking capacitor 43 and is connected between the drain and the source of the low-side switching element 31. The discharge lamp L is connected in parallel with the capacitor 42. The inductor 41 and the capacitor 42 are cooperative to form a resonant circuit, which generates a high frequency resonant current with a high frequency voltage generated by switching operation of the switching elements 31, 32 of the inverter circuit 30, and applies the resonant current to the discharge lamp L for driving it.

The integrated control circuit 100 has a starter circuit 110, a first timer 140, and a selector 150 in a single chip, in addition to the first control unit 121, the second control unit 131, and the driver circuits 122, 132. The starter circuit 110 receives a voltage from the smoothing capacitor 23 and generates a control voltage Vcc across the capacitor 50 and provides the control voltage Vcc to each part of the integrated control circuit 100 for energizing them. That is, when the ballast is connected to the AC power supply, the first control unit 121, in response to the control voltage Vcc from the starter circuit 110, generates the first control signal to turn on and off the switching element 21 of the DC power supply 20, and the second control unit 131 generates the second control signal to turn on and off the switching elements 31, 32 of the inverter circuit 30 alternately. At this time, the first timer 140 starts counting time.

Figure 2:
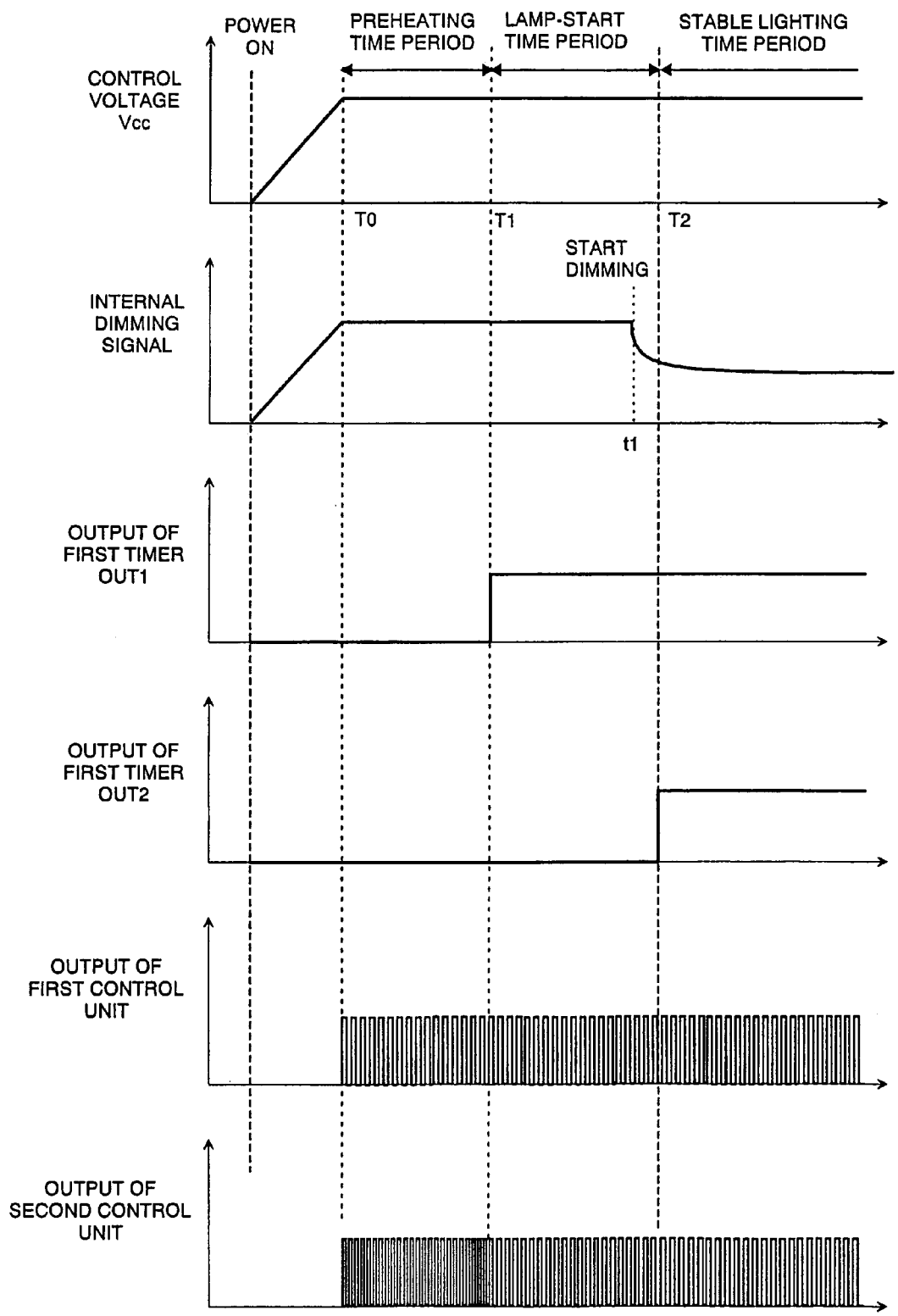
FIG. 2 is a waveform charts for illustrating the operation of the above ballast.

The first timer 140 and the selector 150 change a current and a voltage provided to the discharge lamp L by changing a switching frequency of the switching elements 31, 32 of the inverter circuit 30 with a lapse of a time from a starting. That is, they make a preheating current for preheating the discharge lamp, a starting current for starting the discharge lamp, and a lighting maintenance current for maintaining stable lighting after the starting. The first timer 140 has two output terminals OUT1, OUT2. As shown in FIG. 2, L-level signal is given to the selector 150 from both of the output terminals OUT1, OUT2, between a time T0 and a time T1, immediately after the starting. The selector 150, in response to the signal, gives instruction to the second control unit 131 so that the inverter circuit 30 should provide the preheating current. When the first timer 140 has counted until a predetermined time T1, the output from the output terminal OUT1 becomes H-level, and in response to this, the selector 150 gives instruction to the second control unit 131 so that the inverter circuit 30 should provide the starting current. After that, when the first timer 140 has counted until a predetermined time T2 (T2>T1), the output from the output terminal OUT2 becomes H-level, too, and in response to this, the selector 150 gives instruction to the second control unit 131 so that the inverter circuit 30 should provide the lighting maintenance current. In this way, after power-on, the first timer 140 makes a preheating time period, a lamp-start time period, and a stable lighting time period so as to lead the discharge lamp to stable lighting. The relation of the switching frequency in each period is; f1(the preheating time period)>f2(the lamp-start time period)>f3(the stable lighting time period).

As shown in FIG. 1, the integrated control circuit 100 further includes a dimmer control unit 160, which receives an external dimming signal and converts it into an internal dimming signal and provides an output correction signal which is determined by the internal dimming signal to the second control unit 131 in order to change the switching frequency of the switching elements 31, 32 so that the output of the inverter circuit 30 should be changed to a level specified by the external dimming signal. The dimmer control unit 160 comprises a signal converter 161 which converts the external dimming signal to the internal dimming signal, and an output corrector 162 which receives the internal dimming signal and makes the output correction signal and provide it to the second control unit 131. The output corrector 162 has a counter internally, and, as shown in FIG. 2, is prohibited from providing the output correction signal to the second control unit 131 until the counter counts a predetermined elapsed time t1(T1<t1<=T2) after the starting, irrespective of the existence of the external dimming signal.

Figure 3:
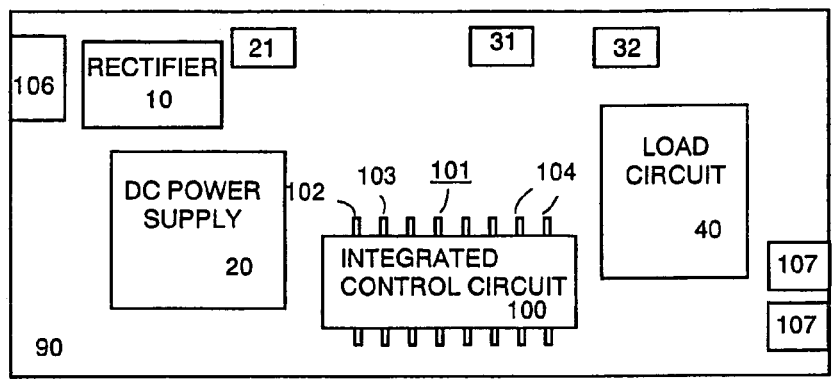
FIGS. 3, 4 and 5 are arrangement drawings of parts composing the above ballast.
Figure 4:
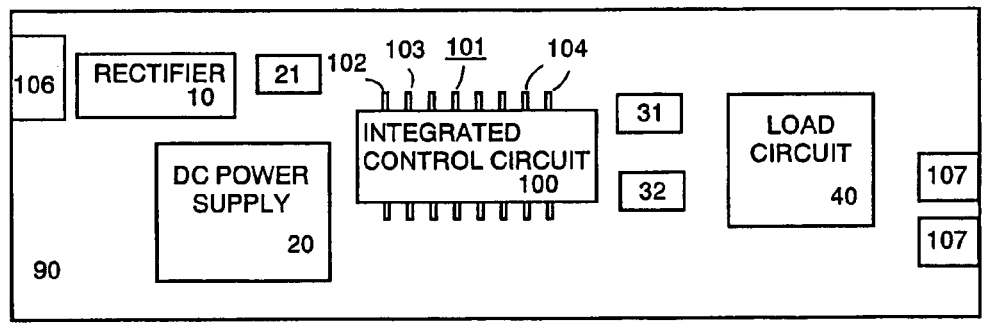
Figure 5:
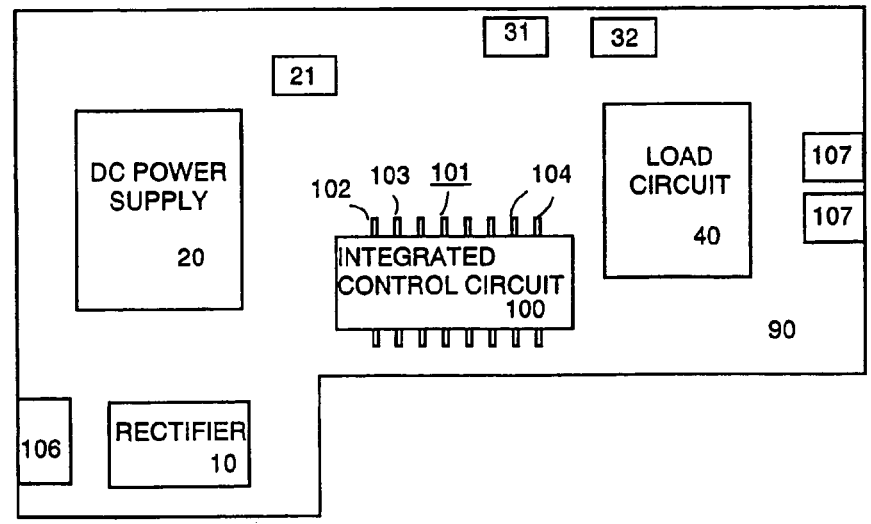

FIGS. 3 to 5 shows examples of packaging in which an IC package, which is a concretization of the integrated control circuit 100, is mounted on a single printed circuit board 90, together with the rectifier 10, the DC power supply 20, the load circuit 40, and the switching elements 21, 31, 32. The IC package 100 is a rectangular parallelepiped, and is arranged so that its longitudinal direction agrees with the longitudinal direction of the printed circuit board 90. Leads 101, which are prepared in the both sides of the package 100, are connected to signal lines on the printed circuit board 90, and a power input terminal 102 and an signal output terminal 103, which are prepared at portions adjacent to one longitudinal end of the package 100, are connected to an output terminal of the DC power supply 20 and the switching element 21, respectively, and signal output terminals 104, which are prepared at portions adjacent to the other longitudinal end, are connected to the switching elements 31, 32. The rectifier 10 is connected to the AC power supply through an input connector 106, and the load circuit 40 is connected to the discharge lamp through output connectors 107. Because the integrated control circuit 100 which includes many circuit elements and wirings between them is packed into one package, the circuit pattern on the printed circuit board 90 is simplified and the flexibility of arrangement of the switching element 21 of the DC power supply 20 and the switching elements 31, 32 of the inverter circuit becomes high. As a result, as shown in FIGS. 3 to 5, it becomes possible to arrange so that all the switching elements line up along the longitudinal direction of the printed circuit board or the switching elements 31, 32 of the inverter circuit and the switching element 21 of the DC power supply 20 are placed in spaced relation to each other, which contributes to the miniaturization of the printed circuit board 90.

Figure 6:
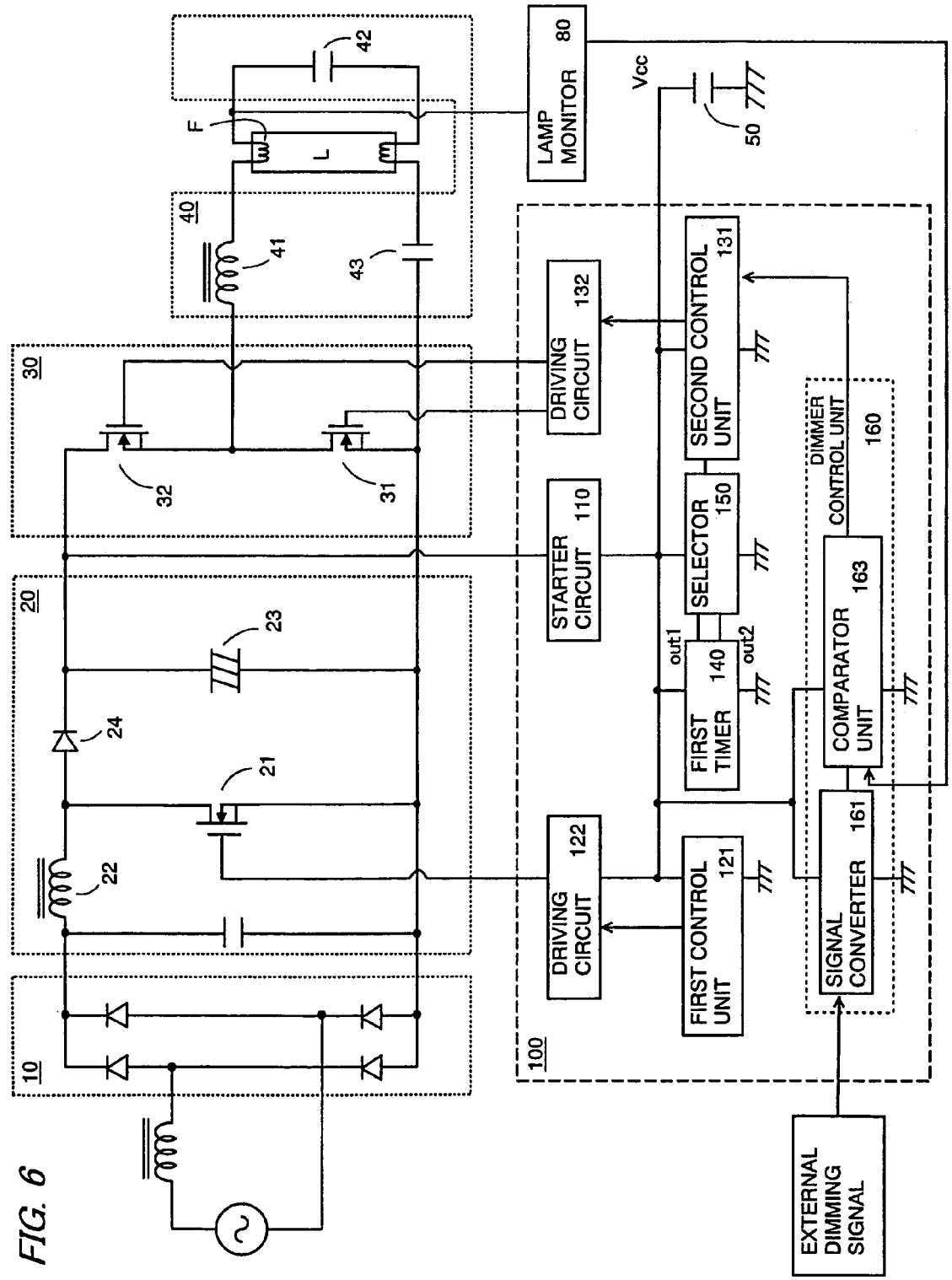
FIG. 6 is a circuit diagram of a ballast for a discharge lamp in accordance with a second embodiment of the present invention.

FIG. 6 shows a ballast for a discharge lamp in accordance with a second embodiment of the present invention. The ballast of this embodiment is identical to the first embodiment except that a lamp monitor 80 for monitoring an operating condition of the discharge lamp is equipped and the dimmer control is performed according to the operating condition of the discharge lamp. So, the similar parts of these embodiments are identified by the same reference character and no duplicate explanation is made here.

The lamp monitor 80 monitors a voltage across the discharge lamp, and provides a detection signal indicating the operating condition of the lamp to a comparator unit 163. The comparator unit 163 provides a correction signal to the second control unit 131, comparing the detection signal with the internal dimming signal given from the signal converter 161, so as to dim the discharge lamp by feedback control. That is, the internal dimming signal and the detection signal are created as what shows the lamp voltage, and when the output of the discharge lamp declines and the detection signal becomes lower than the internal dimming signal, the comparator 163 issues the correction signal which varies the on/off time of the switching elements 31, 32 so that the output of the discharge lamp becomes larger. And, when the detection signal becomes higher than the internal dimming signal, the comparator 163 issues the correction signal which varies the on/off time of the switching elements 31, 32 so that the output of the discharge lamp becomes smaller.

Figure 7:
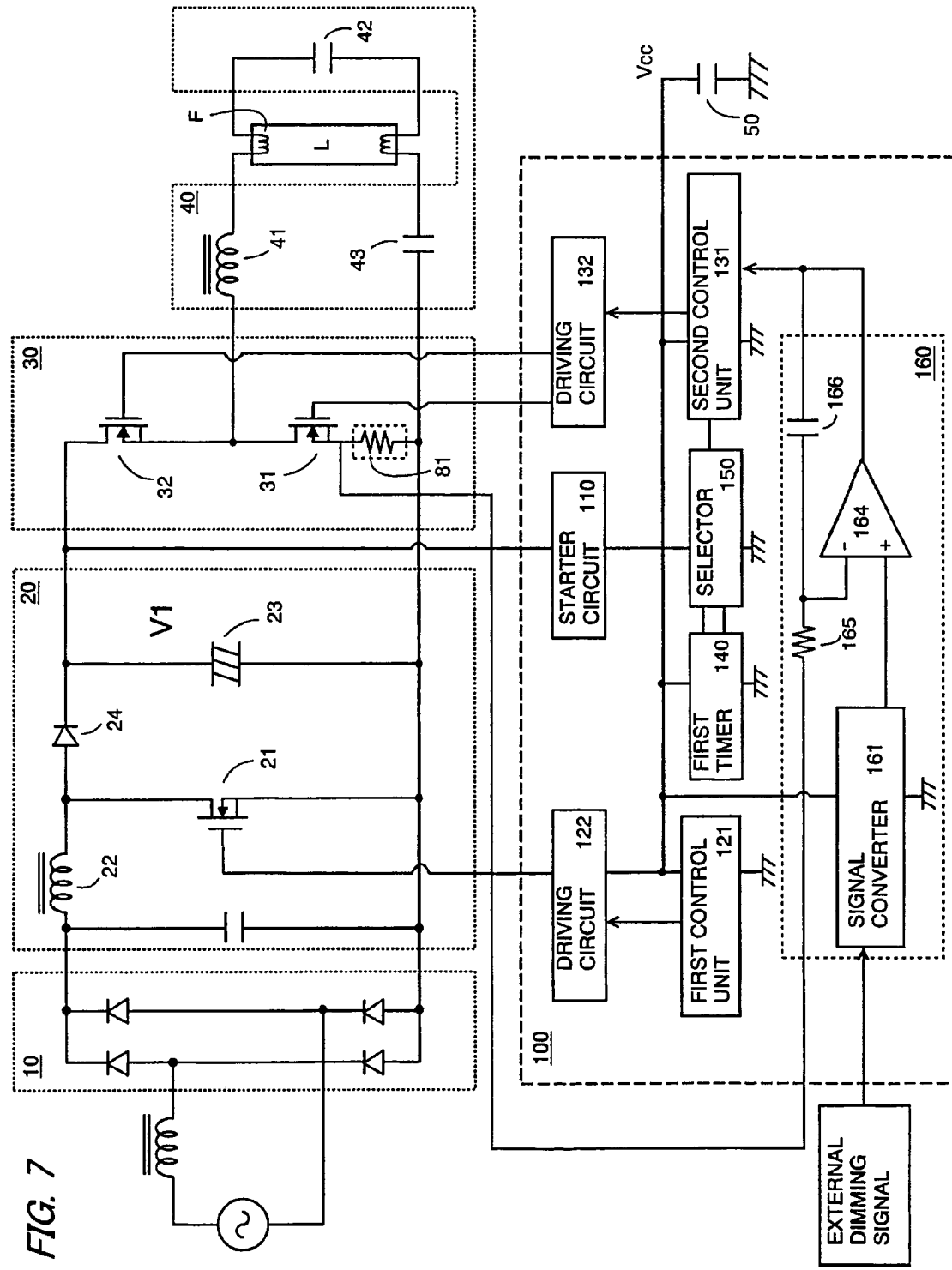
FIG. 7 is a circuit diagram showing a modified embodiment of the second embodiment.

As shown in FIG. 7, the lamp monitor, which monitors the operating condition of the discharge lamp, may use a voltage across a resistance 81 as the detection signal showing the operating condition of the discharge lamp. The resistance 81 is connected between the source and the ground of the low-side switching element 31. In this modified embodiment, an integration circuit is used as the output corrector which receives the internal dimming signal, and as shown in FIG. 7, the integration circuit comprises an operational amplifier 164, a resistance 165, and a capacitor 166. The internal dimming signal is inputted into the noninverting input terminal of the operational amplifier 164, the detection signal from the lamp monitor 81 is inputted into the inverting input terminal of the operational amplifier 164 through a resistance 165, and a capacitor 166 is connected between the output terminal and the inverting input terminal of the operational amplifier 164. In order to dim the discharge lamp according to the external dimming signal, the operational amplifier 164 compares the detection signal with the internal dimming signal and provides the correction signal for varying the switching frequency so that the lamp current from the inverter circuit 30 to the discharge lamp is stabilized, to the second control unit 131. The resistance 165 and the capacitor 166 used as an integration element may be formed in the external of the integrated control circuit 100.

Figure 8:
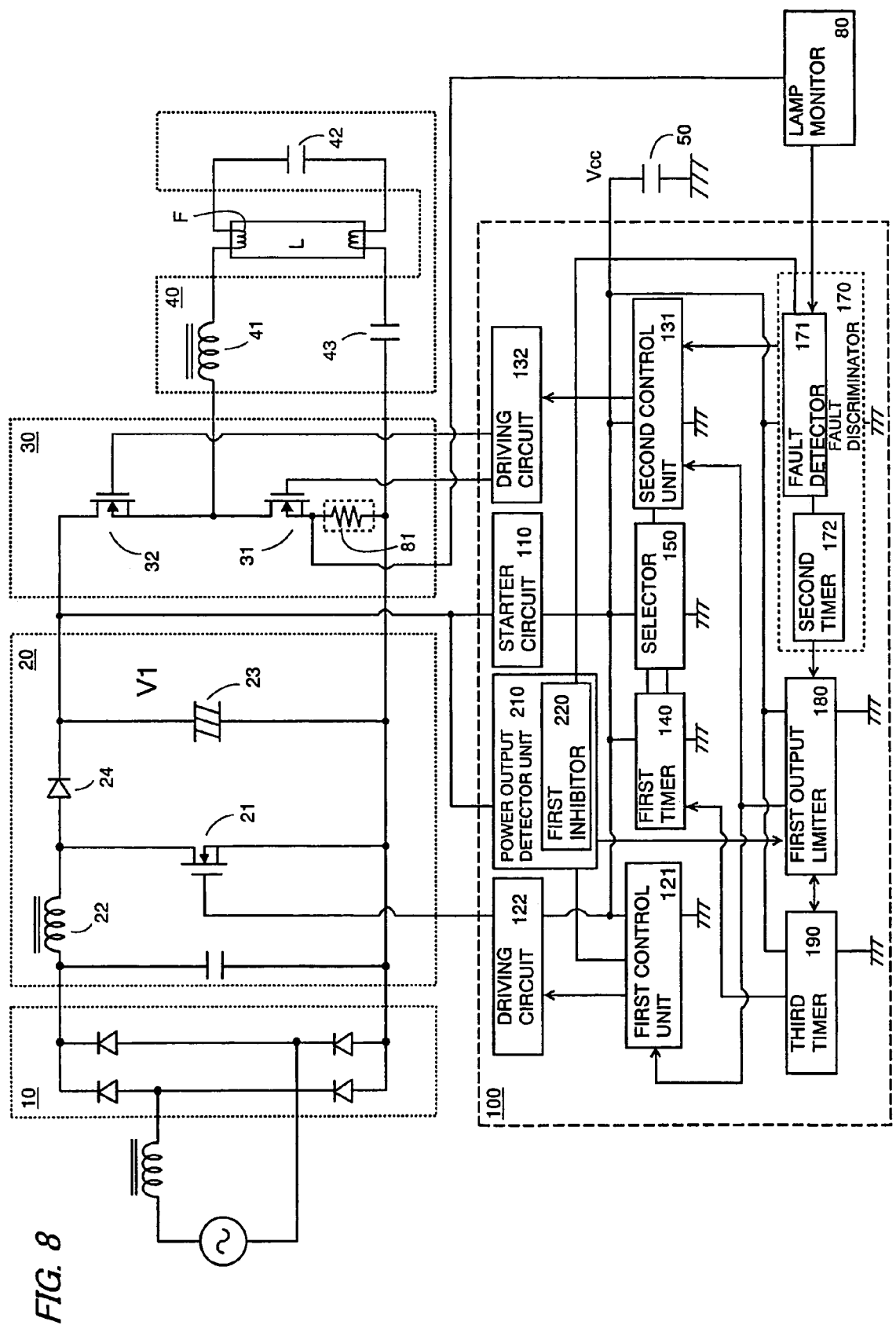
FIG. 8 is a circuit diagram of a ballast for a discharge lamp in accordance with a third embodiment of the present invention.

FIG. 8 shows a ballast for a discharge lamp in accordance with a third embodiment of the present invention. The ballast of this embodiment is identical to the second embodiment shown in FIG. 6 except that a fault discriminator 170 and a first output limiter 180 are further included. So, the similar parts of these embodiments are identified by the same reference character and no duplicate explanation is made here. The fault discriminator 170 includes an fault detector 171 which analyzes the voltage from the lamp monitor 80 which indicates the lamp voltage in order to determine whether the discharge lamp is in an abnormal condition or not, and provides a fault signal when the abnormal condition continues over a predetermined critical timer period decided by a second timer 172. The first output limiter 180, in response to the fault signal, provides a limit signal to the first control unit 121 and the second control unit 131, respectively, to reduce or stop the output of the DC power supply 20 and the inverter circuit 30.

A signal which indicates that the first output limiter 180 issues a first limit signal or a second limit signal is fed to a third timer 190, and the third timer 190 provides a reset signal to the first timer 140 after a lapse of a predetermined restricted time period in the third timer 190. The first timer 140, in response to the reset signal, sets the preheating time period, the lamp-starting period, and the stable lighting time period again so as to restart the discharge lamp.

Figure 9:
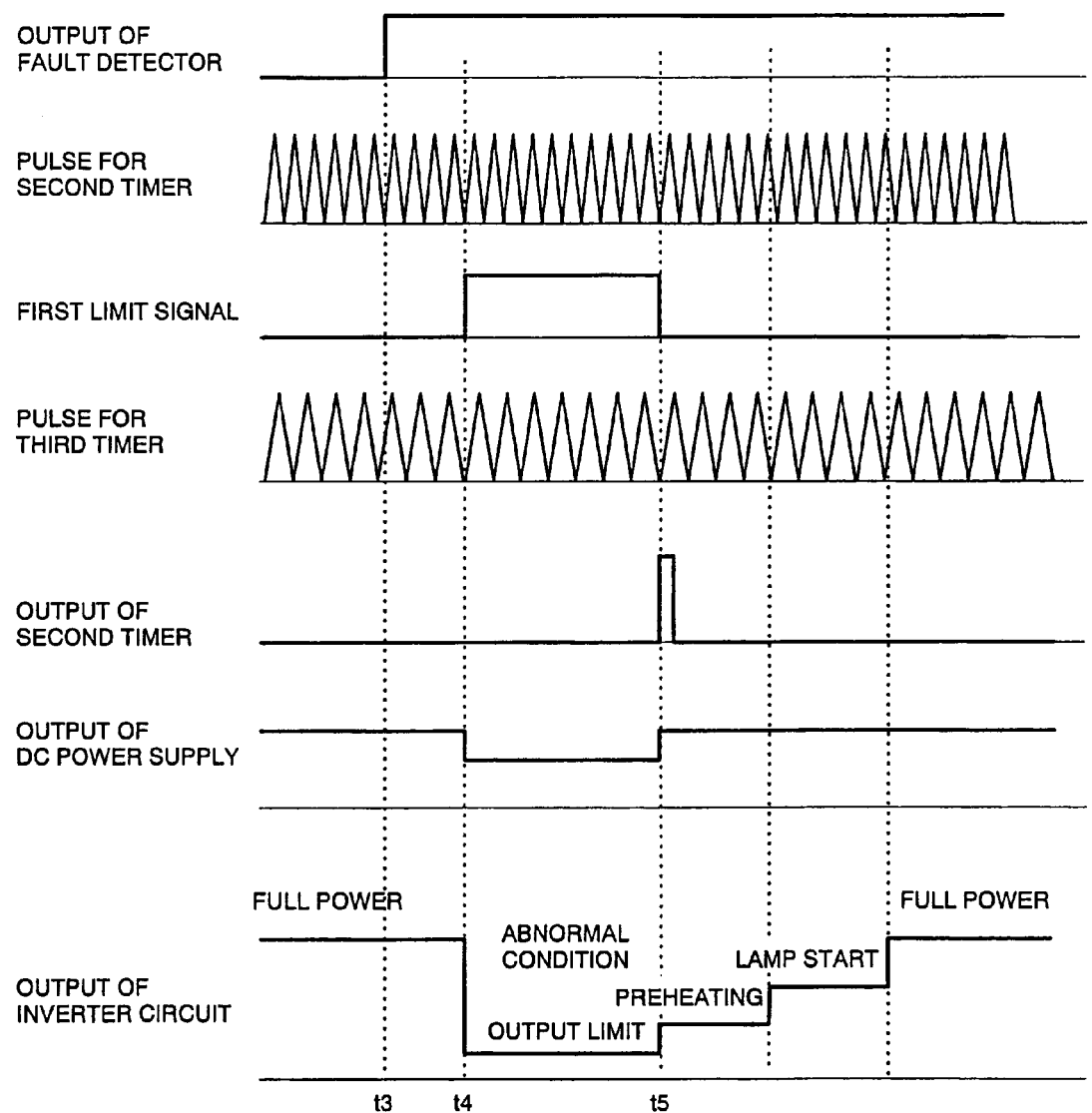
FIG. 9 is waveform charts for illustrating the operation of the above ballast.

FIG. 9 shows signal waveform charts for illustrating the operation at the time of the abnormal condition detection. If the abnormal condition of the discharge lamp is detected at time t3 while the discharge lamp is lighting up stably with full power, the fault signal is fed from the fault discriminator 170 to the first output limiter 180 at time t4 at which the second timer 172 in the fault discriminator 170 counts, for example, three clock pulses in this state. The first output limiter 180, in response to this, provides a H-level limit signal to the first control unit 121 and the second control unit 131. As a result, the output of the DC power supply 20 and the output of the inverter circuit 30 drop to the minimum. The third timer 190 starts operating at the time t4, and provides the reset signal to the first output limiter 180 and the first timer 140 at time t5 at which the third timer 190 counts, for example, seven clock pulses, so that the limit signal is changed into L-level and the first timer 140 is reactivated to restart the discharge lamp after going through the preheating time period and the lamp-starting period. If the abnormal condition has been eliminated at this time, the discharge lamp can keep stable lightning. If the abnormal condition has not been eliminated, the above operating is repeated. And, if the reset signal is generated many times within a predetermined time period, the ballast is stopped because it is thought that there is a serious abnormal condition in the discharge lamp.

Figure 10:
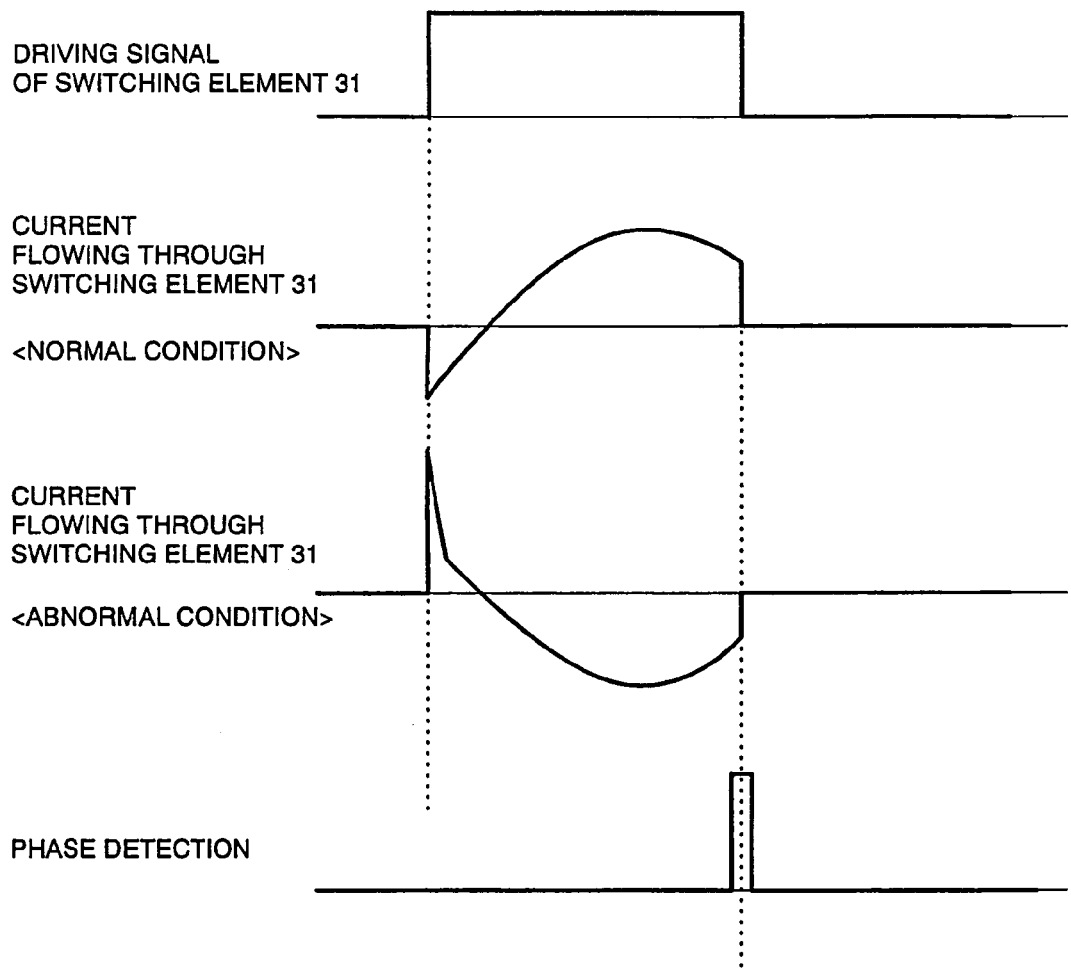
FIG. 10 is a view showing a temperature characteristic of a timer used for the above ballast.

The above abnormal condition is attributable to, for example, the leak of the enclosure gas in the discharge lamp and disconnection of a filament, each of which are due to changing over time. Such abnormal condition is determined based on a phase of the resonance current that flows the inverter circuit. That is, as shown in FIG. 10, when the discharge lamp is normal, a positive current flows when the switching element 31 of the inverter circuit 30 is switched form the on condition to the off condition. But, if the discharge lamp is abnormal, the resonant current in the resonant circuit which comprises the inductor 41 and the capacitor 43 becomes a leading phase with respect to the current which flows the switching element 31, and as a result, a negative current flows through the switching element 31 when the switching element 31 is switched from the on condition to the off condition. Therefore, the abnormal condition of the discharge lamp can be detected by checking the phase of the current which flows through the switching element 31 when the driving signal to the switching element 31 is switched off.

By the way, because the output voltage of the DC power supply 20 is usually low in the preheating time period of the discharge lamp, the input voltage to the inverter circuit 30 is low, too, even if the discharge lamp is normal. So, the resonant current may become a leading phase with respect to the current which flows the switching element 31, and the fault detector 171 may detect the abnormal condition, and the fault discriminator 170 may generate the fault signal, and as a result, the output of the inverter circuit may be restricted. In order to avoid such inconvenience, in this embodiment, the operation of the first output limiter is disabled until the output voltage of the DC power supply 20 exceeds a predetermined level to shift to the stable lighting through the preheating time period and the lamp-start time period.

In order to prevent such a false output limit in the preheating time period, a power output detector unit 210 which detects the DC output voltage from the DC power supply 20 is provided, and a first inhibiting signal is fed from a first inhibitor 220 in the power detector unit 210 to the first output limiter 180 and the fault discriminator 170 while the DC output voltage goes below a predetermined level to prohibit the first output limiter 180 from limit the output of the DC power supply 20 and the inverter circuit 30. In addition, the power output detector unit 210 always sends the DC output voltage to the first control unit 121, and the first control unit 121 varies the duty ratio or frequency of the switching element 21 by feedback control based on this output voltage to control the output voltage into a predetermined value.

Although, in this embodiment, the first inhibitor 220 is provided in the power output detector unit 210 to output the first inhibiting signal for prohibiting the operation of the first output limiter 170 when the DC power supply 20 is rising, this invention is not limited to this and, for example, a timer may be used in place of the first inhibitor 220. The timer sets up a time period within which the output of the DC power supply 20 rises until enough level and, during the time period, the timer outputs the first inhibiting signal. This timer can share the first timer.

In addition, each of the timers provided in the integrated control circuit 100 can use a clock pulse outputted from the same pulse generator.

Figure 11:
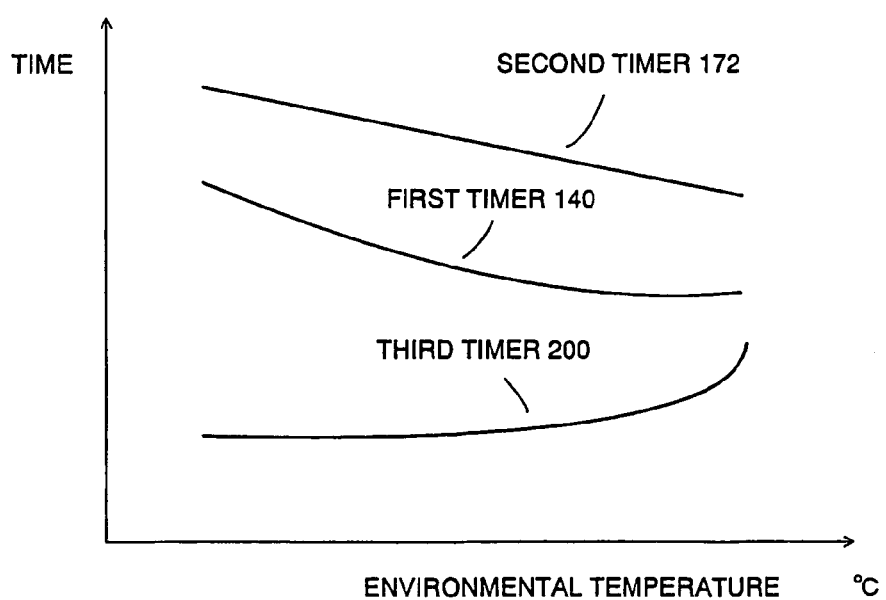
FIG. 11 is a graph showing a temperature characteristic of timers used for the above ballast.

Furthermore, as shown in FIG. 11, the first timer 140, the second timer 172, and the timer in the fault discriminator 170 are given a temperature characteristic, respectively, and change a time to be counted according to an environmental temperature. The first timer sets up the preheating time period and the lamp-start time period, and when the environmental temperature goes down, initial electric discharge of the discharge lamp may be hard to take place. For this reason, the first timer is given a negative temperature characteristic, and the preheating time period and the lamp-start time period are lengthened as the environmental temperature decreases. That is, the width of the clock pulse is changed according to the environmental temperature, whereby the time period that is decided by the same number of counts is changed.

The second timer 172 in the fault discriminator 170 judges whether the abnormal condition of the discharge lamp continues a predetermined time period or not, and sets up the time period from the generation of the abnormal condition to the output limit. When the fault condition is generated in the discharge lamp, a stress, which is larger than what is in the normal condition, is applied to electronic parts constituting the inverter circuit 30, and the temperature of the electronic parts rises. For this reason, the second timer is given a negative temperature characteristic, and a time period to be counted is shortened according to the rising of the ambient temperature due to the rising of the electronic parts. Therefore, the time period from the generation of the abnormal condition to the output limit becomes short, which results in reducing the stress applied to the electronic parts.

The third timer 190 has a role to reset the first timer 140 after the output limit accompanying the detection of the abnormal condition of the discharge lamp starts, and to set up a time period from the initial condition of the DC power supply 20 and the inverter circuit 30 to the restart. That is, the third timer sets up the restricted time period. When the fault condition is generated in the discharge lamp, a stress is applied to the electronic parts and the temperature of the electronic parts rises. In consideration of that, the restricted time period is provided to lower the temperature of the electronic parts which has increased in such an abnormal condition. For this reason, the third timer is given a positive temperature characteristic, and the restricted time period is lengthened as the temperature of the electronic parts rises, whereby sufficient time for lowering the temperature of the electronic parts can be ensured. That is, the more the temperature of the electronic parts rises, the more the restricted time period increases.

Figure 12:
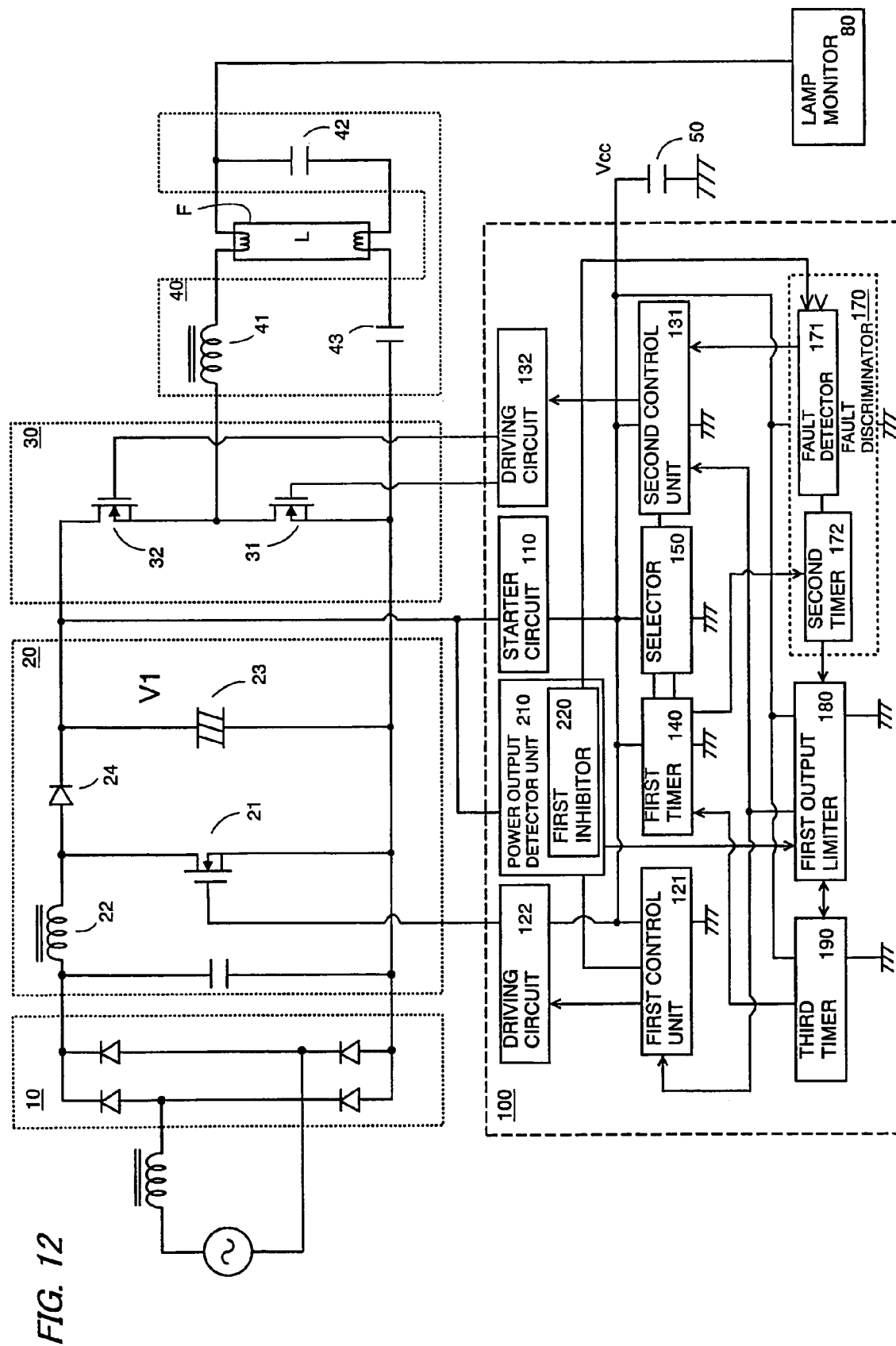
FIG. 12 is a circuit diagram of a ballast for a discharge lamp in accordance with a forth embodiment of the present invention.
Figure 13:
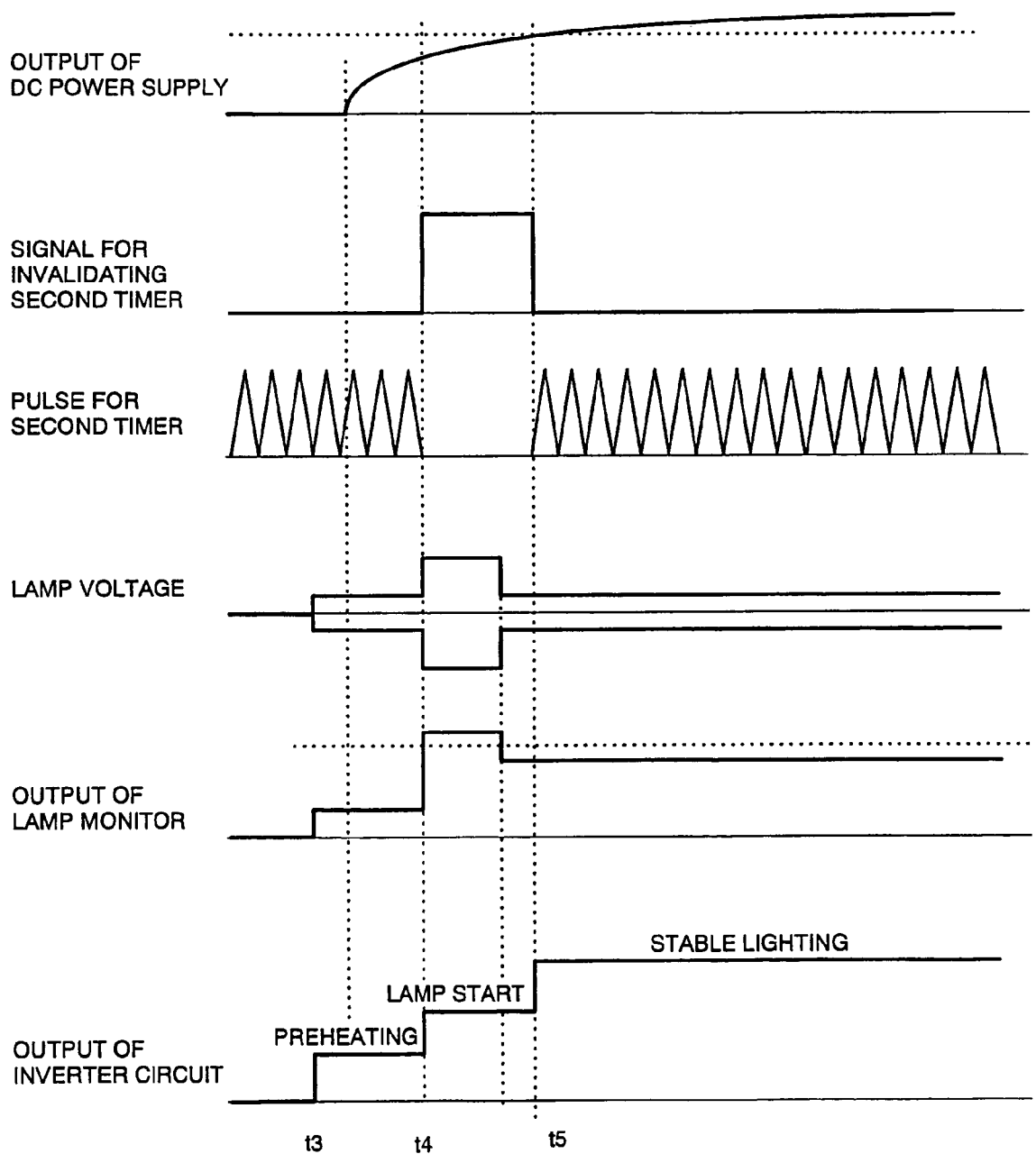
FIG. 13 is waveform charts for illustrating the operation of the above ballast.

FIG. 12 shows a ballast for a discharge lamp in accordance with a forth embodiment of the present invention. The ballast of this embodiment is identical to the ballast shown in FIG. 8 essentially except that the fault detector 171 monitors the lamp voltage applied to the discharge lamp to detect the abnormal condition of the discharge lamp. So, the similar parts of these embodiments are identified by the same reference character and no duplicate explanation is made here. The fault detector 171 detects the abnormal condition when the lamp voltage exceeds a predetermined threshold, and the fault discriminator 170 generates the fault signal to restrict the output of the DC power supply and the inverter circuit 30 when the abnormal condition continues over a predetermined time period determined by the second timer 172. However, even if the discharge lamp is in a normal condition, the lamp voltage may exceed a threshold in the lamp-start time period. Therefore, in this embodiment, the function of the first output limiter 180 is disabled during the lamp-start time period so that the outputs of the DC power supply 20 and the inverter circuit 30 will not be restricted accidentally during the lamp-start time period. That is, the first timer 140, which decides the lamp-start time period, provides a signal which invalidates the operation of the second timer 172 during the lamp-start time period to the second timer 172. By this, as shown in FIG. 13, even if the lamp voltage exceeds a predetermined threshold temporarily in the lamp-start time period, the fault discriminator 170 does not generate the fault signal, thereby preventing the outputs of the DC power supply 20 and the inverter circuit 30 from being restricted.

Figure 14:
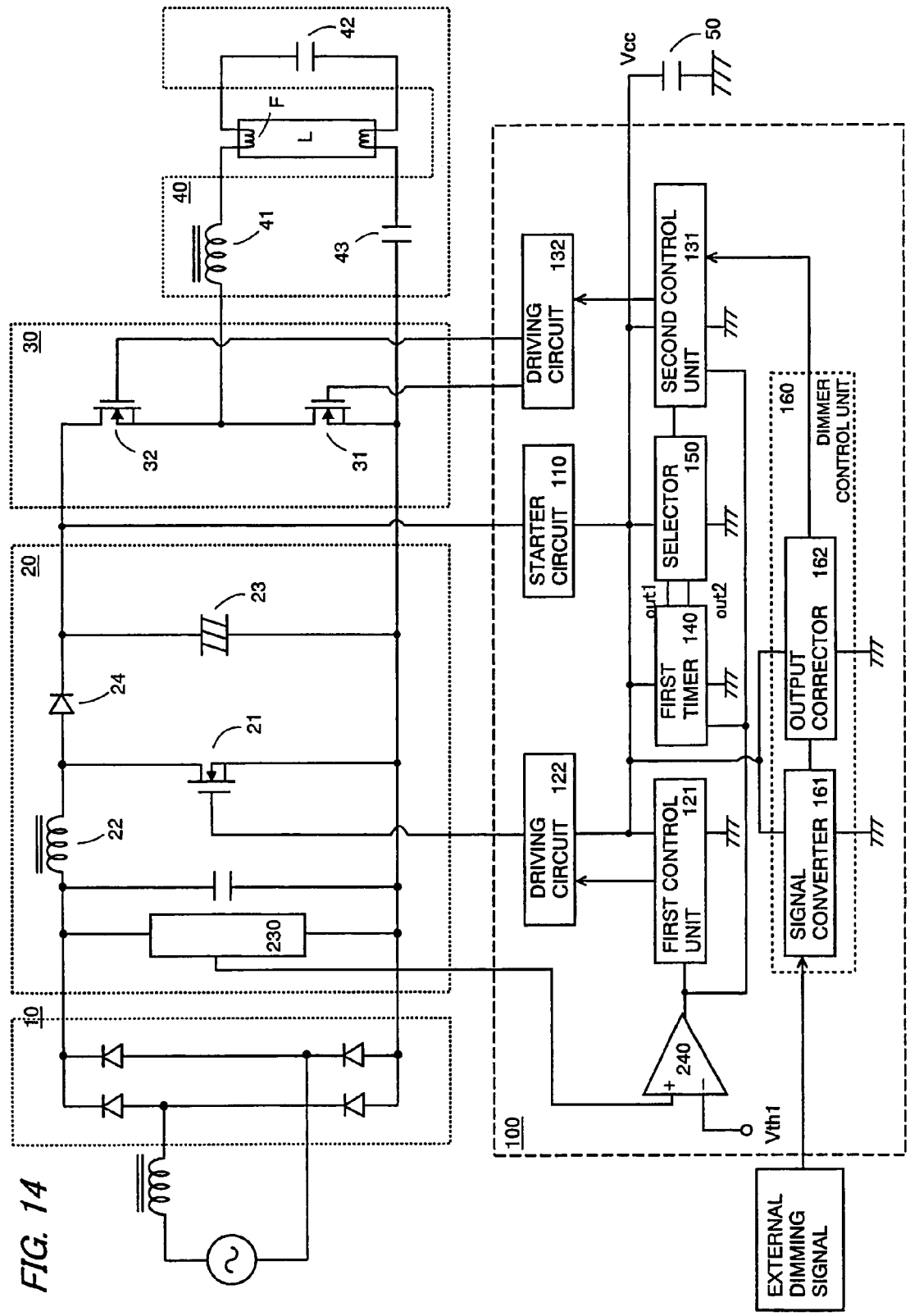
FIG. 14 is a circuit diagram of a ballast for a discharge lamp in accordance with a fifth embodiment of the present invention.

FIG. 14 shows a ballast for a discharge lamp in accordance with a fifth embodiment of the present invention. The ballast of this embodiment is identical to the ballast shown in FIG. 1 except that a comparator unit 240 and a power input monitor 230 which monitors an input voltage to the DC power supply 20 are included. So, the similar part of these embodiments are identified by the same reference character and no duplicate explanation is made here.

Figure 15:
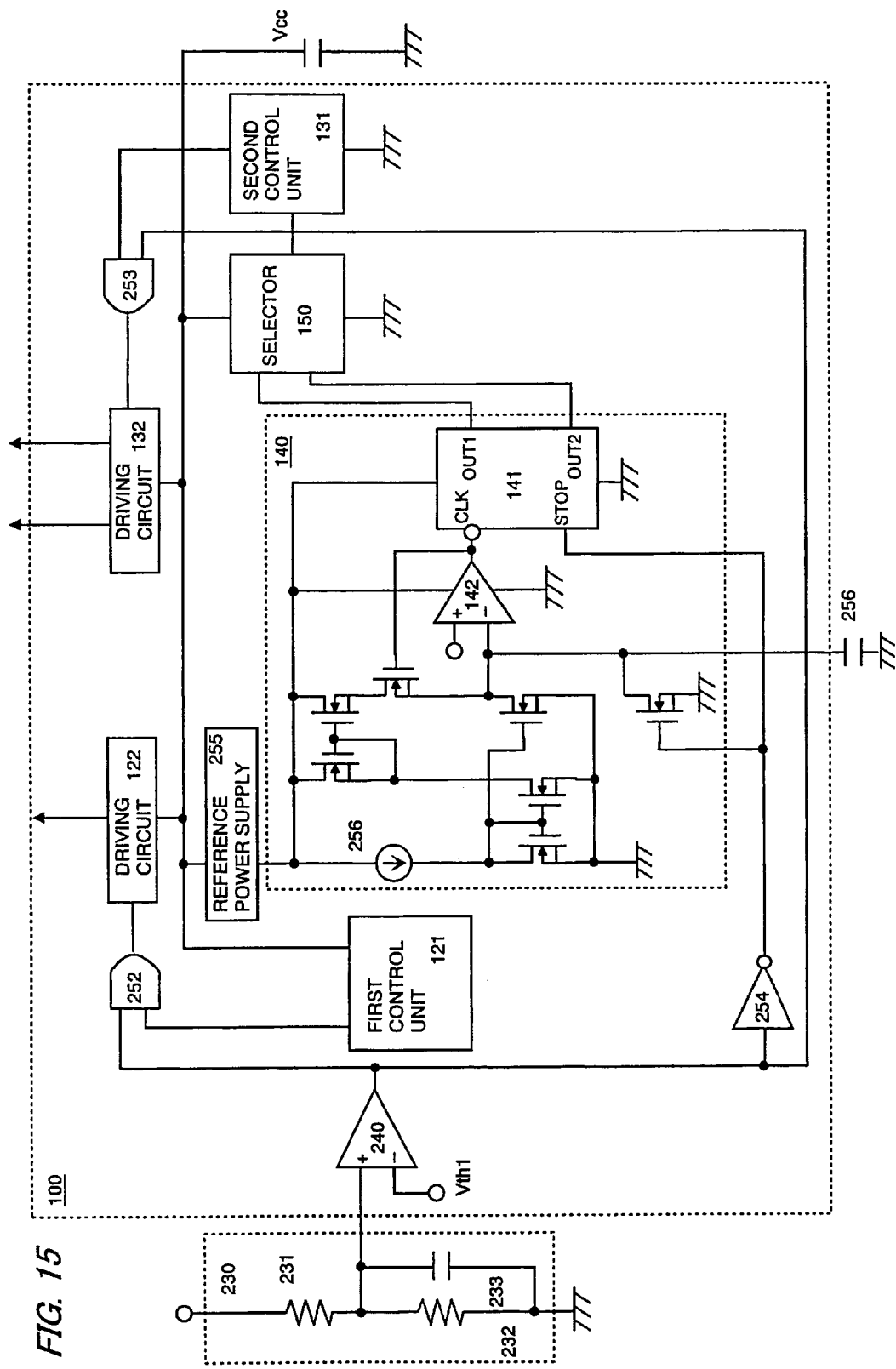
FIG. 15 is a detailed circuit diagram of FIG. 14.

As shown in FIG. 15, the power input monitor 230 comprises a pair of resistances 231, 232 connected in series across the output terminal of the rectification circuit 10, and a capacitor 233 connected in parallel with the one resistance 232, and the power input monitor 230 smooths the pulsating flow voltage inputted from the rectification circuit 10 to the DC power supply 20 by the capacitor 233 and provides the smoothed voltage across the capacitor to the noninverting input terminal of the comparator unit 240. The comparator unit 240 compares the input voltage with a first threshold Vth1 and outputs a signal which enables the first control unit 121, the second control unit 131, and the first timer 140 when the input voltage exceeds the first threshold Vth1. The comparator 240 is provided in the integrated control circuit 100, and its output is fed to AND gates 252, 253 as well as to a STOP terminal of a counter 141 in the first timer 140 through an inverter 254.

The first timer 140 receives a power, which is made from a control voltage Vcc, from a reference power supply 255. The first timer 140 includes a current mirror circuit which comprises a constant current source 256 connected to the reference power supply 255 and a plurality of FETs, a comparator unit 142, and the counter 141. The current mirror circuit is connected so as to provide a charge and a discharge current to an outside capacitor 256 as well as connected to the comparator unit 142, and it generates a triangular wave voltage across the capacitor 256 and compares the triangular wave voltage with a reference value provided to the noninverting input terminal of the comparator unit 142 to send a clock signal to the counter 141.

Figure 16:
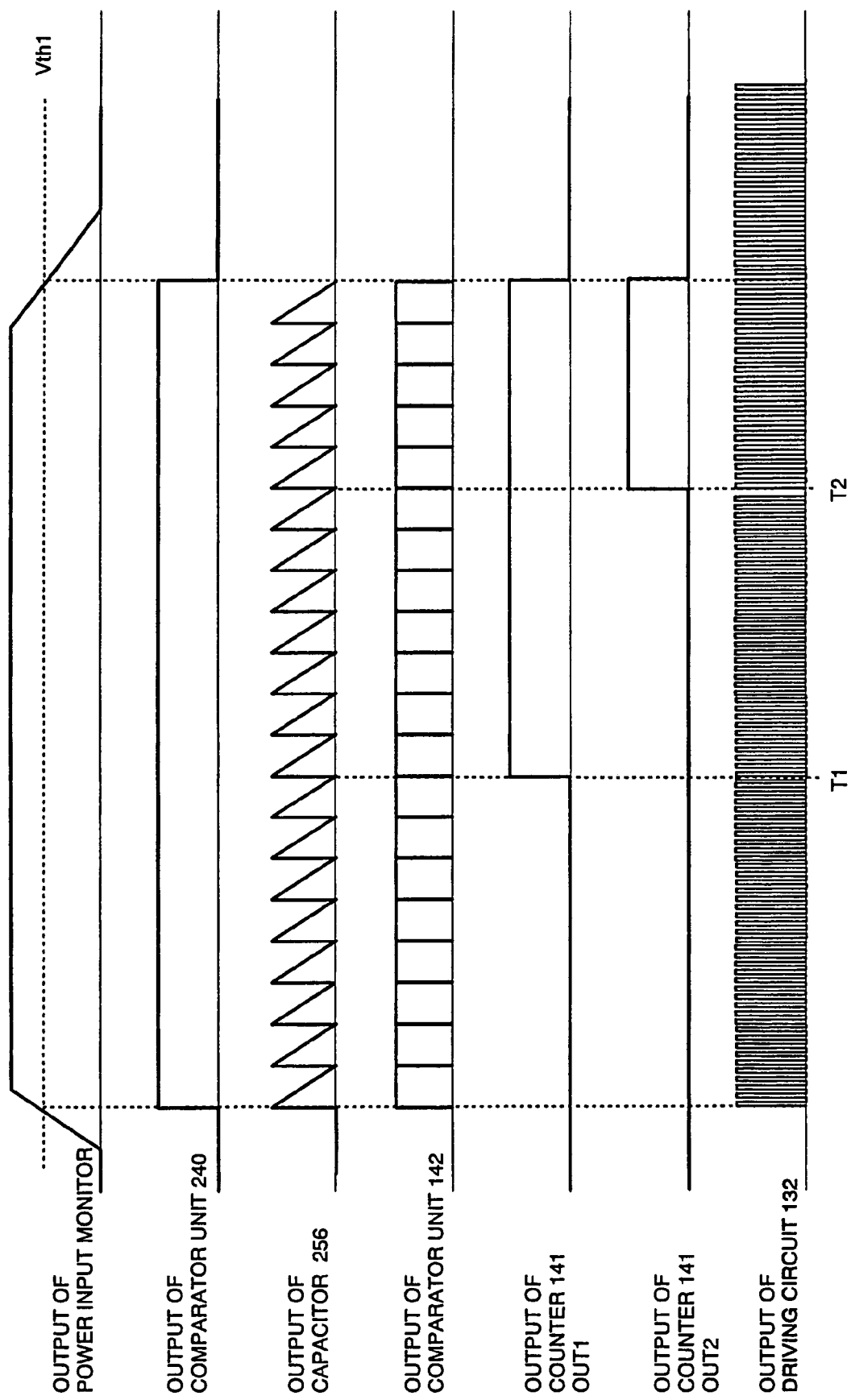
FIG. 16 is waveform charts for illustrating the operation of the above ballast.

The counter 141 has a STOP terminal, and the counter stops counting while the input to the STOP terminal is H-level, that is, while the output of the power input monitor 230 is lower than the threshold Vth1, to keep the outputs of the OUT1 and OUT2 at L-level, as shown in FIG. 16. The selector 150 recognizes this state, and the selector 150 issues a directive to the second control unit 131 so that the inverter circuit 30 provides the preheating current. After that, when the input to the STOP terminal becomes L-level, that is, when the output of the power input monitor 230 exceeds the threshold Vth1 and a sufficient input is provided to the DC power supply 20, the counter 141 begins to count, and the counter 141 changes the output terminal OUT1 into H-level at time T1 after a lapse of a predetermined time and issues a directive to the selector 150 to start the lamp-start time period. After that, at time T2 after a lapse of a predetermined time, the counter 141 changes the output terminal OUT2 into H-level and issues a directive to the selector 150 to stop the lamp-start time period and to start the stable lighting.

If the output of the AC power supply is interrupted instantaneously or drops instantaneously, the output of the power input monitor 230 also drops simultaneously, and if the output of the power input monitor 230 goes below the threshold Vth1 of the comparator unit 240, the control signals from the first control unit 121 and the second control unit 131 do not reach the driving circuits 122, 132, as a result, the switching element 21 of the DC power supply 20 and the switching element 31, 32 of the inverter circuit 30 turn off, and the ballast stops. When the AC power supply resumes, the counter begins to work after being reset, therefore, the discharge lamp is turned on according to the normal procedure; the preheating time period and the lamp-start time period. Thus, a big stress does not act on the electronic parts.

Figure 17:
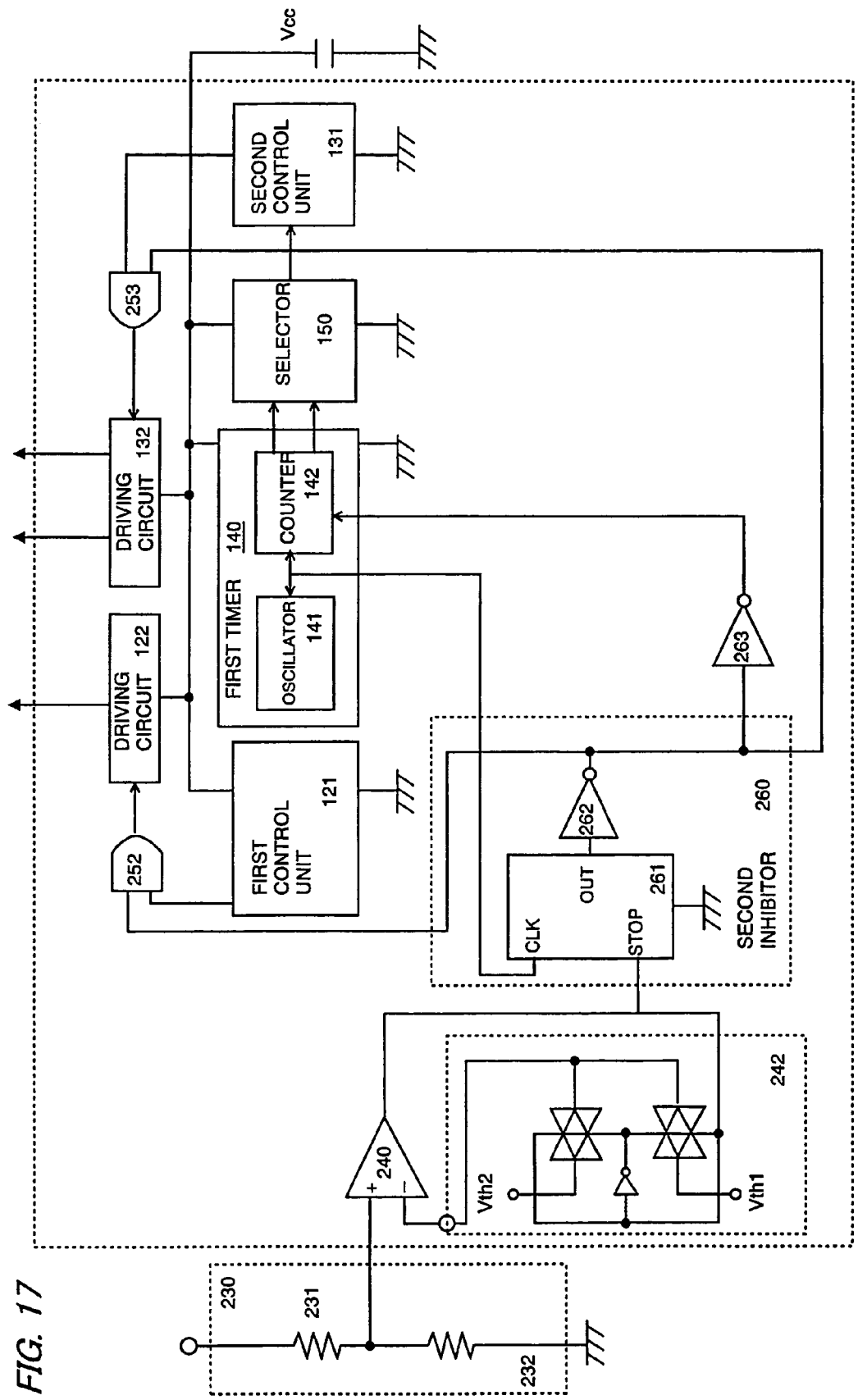
FIG. 17 is a circuit diagram of a ballast for a discharge lamp in accordance with a sixth embodiment of the present invention.
Figure 18:
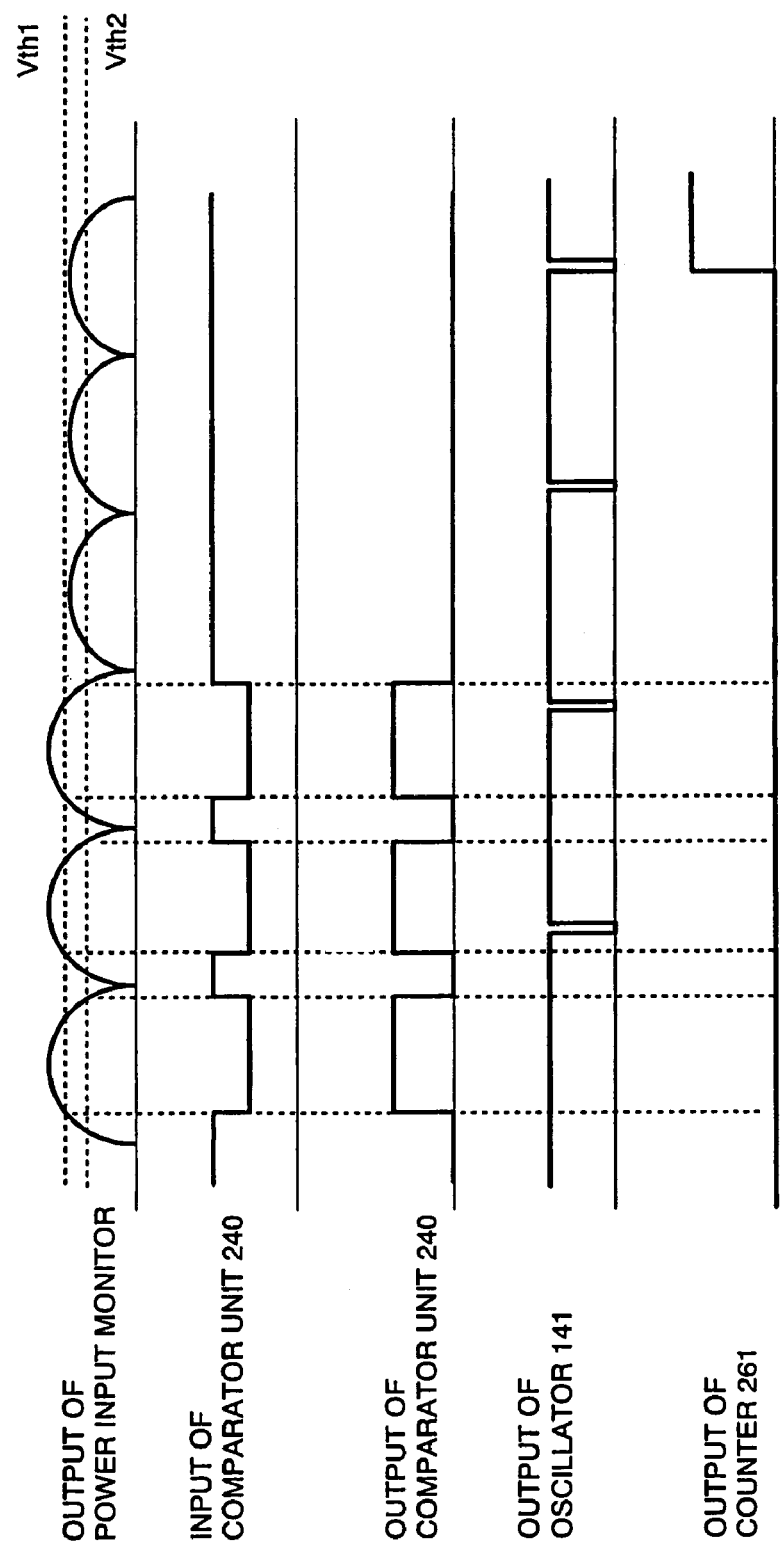
FIG. 18 is waveform charts for illustrating the operation of the above ballast.

FIG. 17 shows a ballast for a discharge lamp in accordance with a sixth embodiment of the present invention. The ballast of this embodiment is identical to the ballast shown in FIG. 7 except that the power input monitor 230 monitors the pulsating flow voltage which is the output of the rectification circuit 10 and the inverter circuit 30 is controlled based on the pulsating flow voltage. So, the similar parts of these embodiments are identified by the same reference character and no duplicate explanation is made here. The power input monitor 230 comprises resistances 231, 232 connected in series between the output terminals of the rectification circuit 10, and, as shown in FIG. 18, it outputs the pulsating flow voltage, which is a full-wave rectification of the AC voltage, to the noninverting input terminal of the comparator unit 240.

The comparator unit 240 compares the pulsating flow voltage with thresholds having a hysteresis characteristic Vth1, Vth2 (<Vth1). The output of the comparator unit is fed to a second inhibitor 260 which delays a time to reset the first timer 140 after the input voltage to the DC power supply 20 decreases. The thresholds Vth1, Vth2 are prepared by a hysteresis circuit 242, and if the pulsating flow voltage exceeds the first threshold Vth1, the second threshold Vth2 is fed to the inverting input terminal of the comparator unit 240, and if the pulsating flow voltage goes below the second threshold, then the first threshold Vth1 is fed to the inverting input terminal of the comparator unit 240.

The second inhibitor 260 is provided for preventing the first timer 140 from being reset when the input voltage to the DC power supply 20 drops instantaneously. The second inhibitor 260 has a counter 261 and an inverter 262. The OUT terminal of the counter 261 is kept at L-level until the pulsating flow voltage inputted to the comparator unit 240 goes below the second threshold after it goes above the first threshold Vth1. That is, the output terminal OUT of the counter 261 is kept at L-level so as not to control the first timer 140 while the input voltage to the DC power supply is sufficiently high. Although when a clock signal is fed to a clock input terminal CLK of the counter 261 from a oscillator 141 of the first timer 140 the counter 261 counts a time, the input to the terminal STOP is kept at H-level and the output terminal OUT is kept at L-level until the pulsating flow voltage which is inputted to the comparator unit 240 goes below the second threshold after it goes above the first threshold Vth1. On the other hand, when the pulsating flow voltage decreases and goes below the second threshold Vth2, the output of the comparator unit 240 is switched from the H-level to the L-level, and then the counter 261 starts counting. If such a state continues until the trailing edge of the clock signal is detected twice, the output of the counter 261 becomes H-level, and the H-level output is provided to the counter 142 of the first timer 140 through the inverters 262, 263 to stop the counter 142. By this, the counter 142 of the first timer 140 is reset, and the preheating time period, the lamp-start time period, and a stable lighting time period are set up to restart the discharge lamp. At that time, the output from the inverter 262 to the AND gates 252, 253 is L-level, which stops the driving circuits 122, 132 to stop the DC power supply 20 and the inverter circuit 30.

As described above, the second inhibitor 260 resets the preheating time period and the lamp-start time period of the first timer 140 when the input voltage to the DC power supply 20 decreases and such state continues over a predetermined time period (a time period in which the trailing edge of the clock signal is detected twice). As a result, even if the input voltage drops instantaneously, the first timer 140 is not reset, and the ballast continues operating and is prevented from starting the restart operation carelessly.

Figure 19:
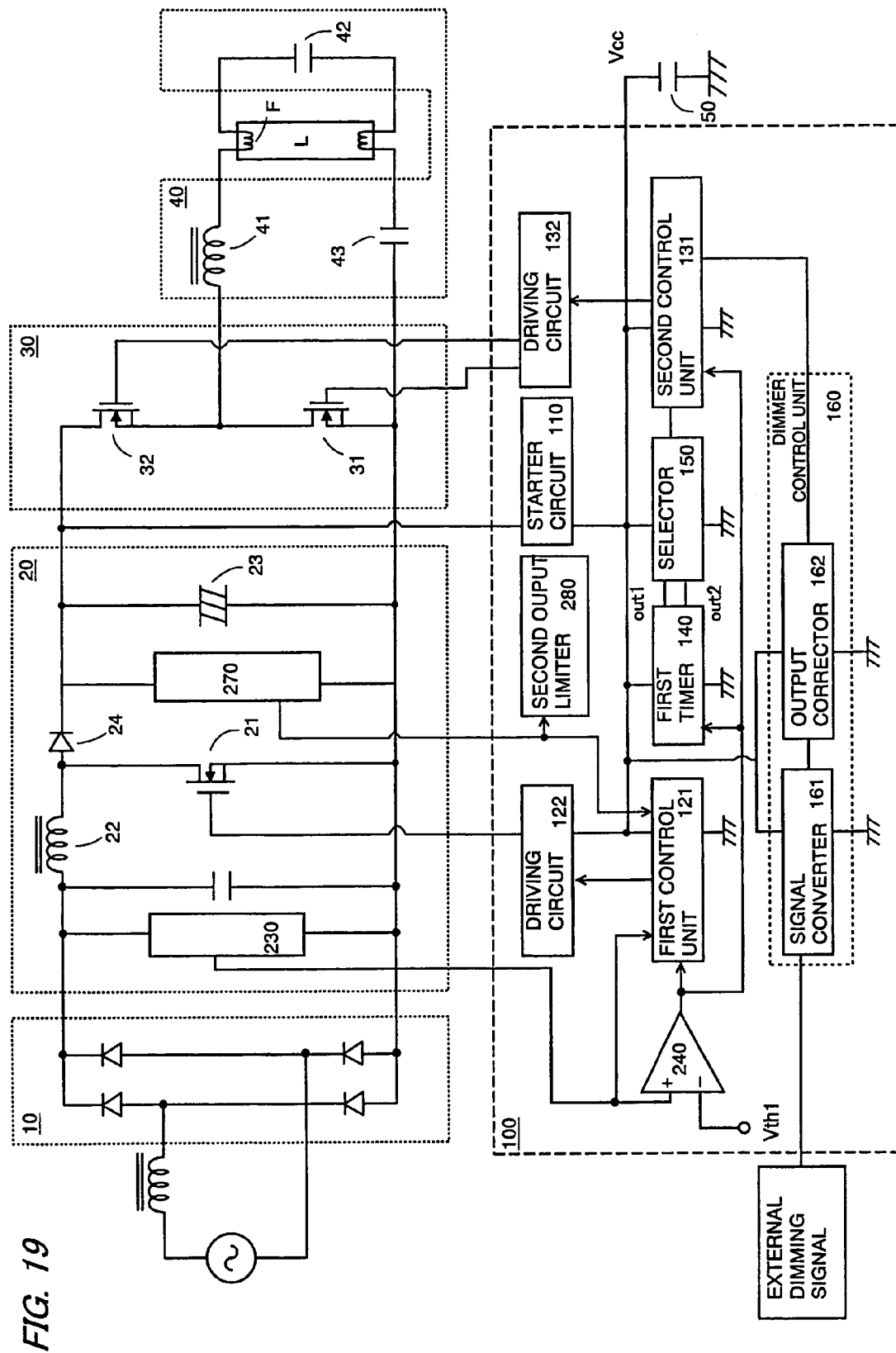
FIG. 19 is a circuit diagram of a ballast for a discharge lamp in accordance with a seventh embodiment of the present invention.

FIG. 19 shows a ballast for a discharge lamp in accordance with a seventh embodiment of the present invention. The ballast of this embodiment is identical to the ballast shown in FIG. 17 except that a second output limiter 280, which monitors the output from the DC power supply 20 and restricts the output from the inverter circuit 30 based on the output of the DC power supply 20, is further included. So, the similar parts of these embodiments are identified by the same reference character and no duplicate explanation is made here.

Figure 20:
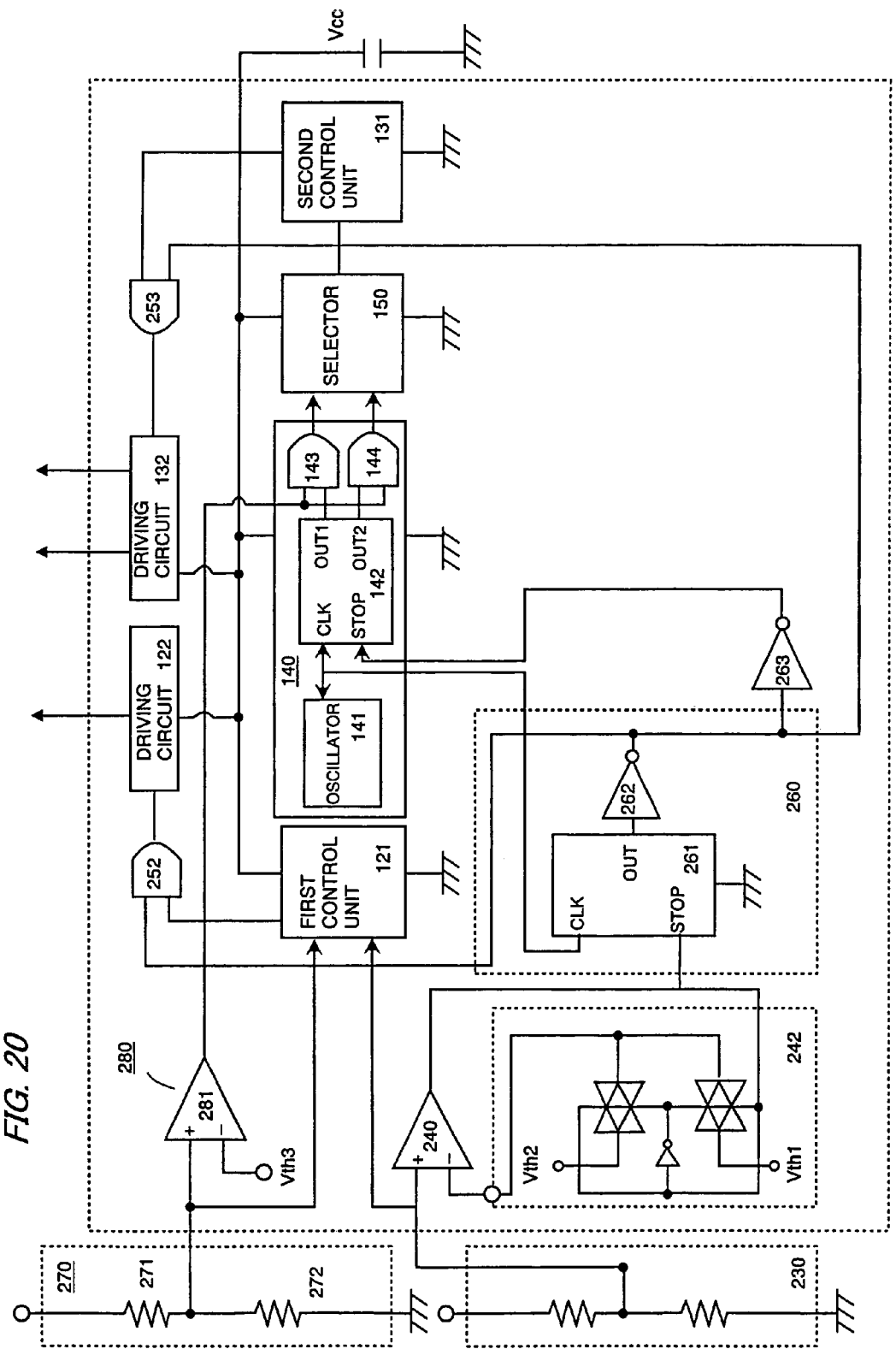
FIG. 20 is a detailed circuit diagram of FIG. 19.

As shown in FIG. 20, the second output limiter 280 has a comparator unit 281, which compares an output from a power output monitor 270 comprising two resistances 271, 272 connected across the DC power supply 20 with a third threshold Vth3, and reflects the comparison result to the first timer 140. The first timer 140 has AND gates 143, 144 as well as the oscillator 141 and the counter 142. The output of the comparator unit 281 is fed to the AND gates 143, 144. The outputs from the output terminals OUT1, OUT2 of the counter 142 is fed to the selector 150 in order to set up the preheating time period, the lamp-start time period, and the stable lighting time period. As described in the first embodiment based on FIG. 2, when the outputs of both of the output terminals OUT1, OUT2 are L-level, the preheating time period is set up, and when the output of the output terminal OUT1 is H-level and the output of the output terminal OUT2 is L-level, the lamp-start time period is set up, and when the outputs of both of the output terminals OUT1, OUT2 are H-level, then the stable lighting time period is set up. The outputs of these output terminals OUT1, OUT2 are fed to the AND gates 143, 144, respectively. Therefore, the preheating time period is forced to continue until the output from the DC power supply exceeds the threshold Vth3, so that the output of the inverter circuit 30 is restricted.

Figure 21:
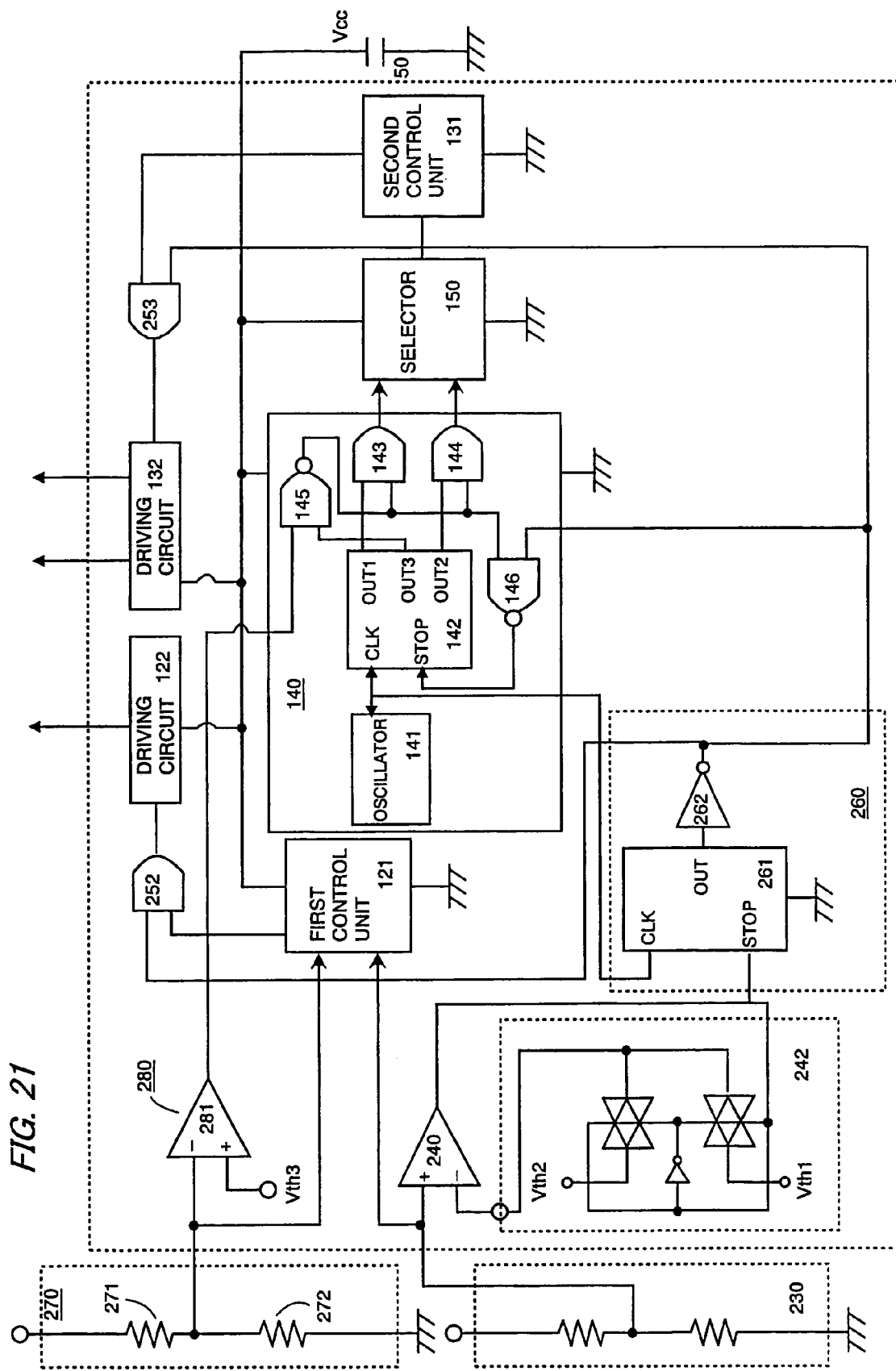
FIG. 21 is a circuit diagram of a ballast for a discharge lamp in accordance with a eighth embodiment of the present invention.

FIG. 21 shows a ballast for a discharge lamp in accordance with a eighth embodiment of the present invention. The ballast of this embodiment is identical to the ballast shown in FIG. 20 except that the composition of the second output limiter 280 and the first timer 140 is changed so that the first timer is not reset even if the output of the DC power supply 20 drops instantaneously before a lapse of a predetermined time period from the beginning of the lamp-start time period, and the first timer is reset to restart the discharge lamp only when the output of the DC power supply 20 drops after a lapse of predetermined time period from the beginning of the lamp-start time period. So, the similar parts of these embodiments are identified by the same reference character and no duplicate explanation is made here.

Figure 22:
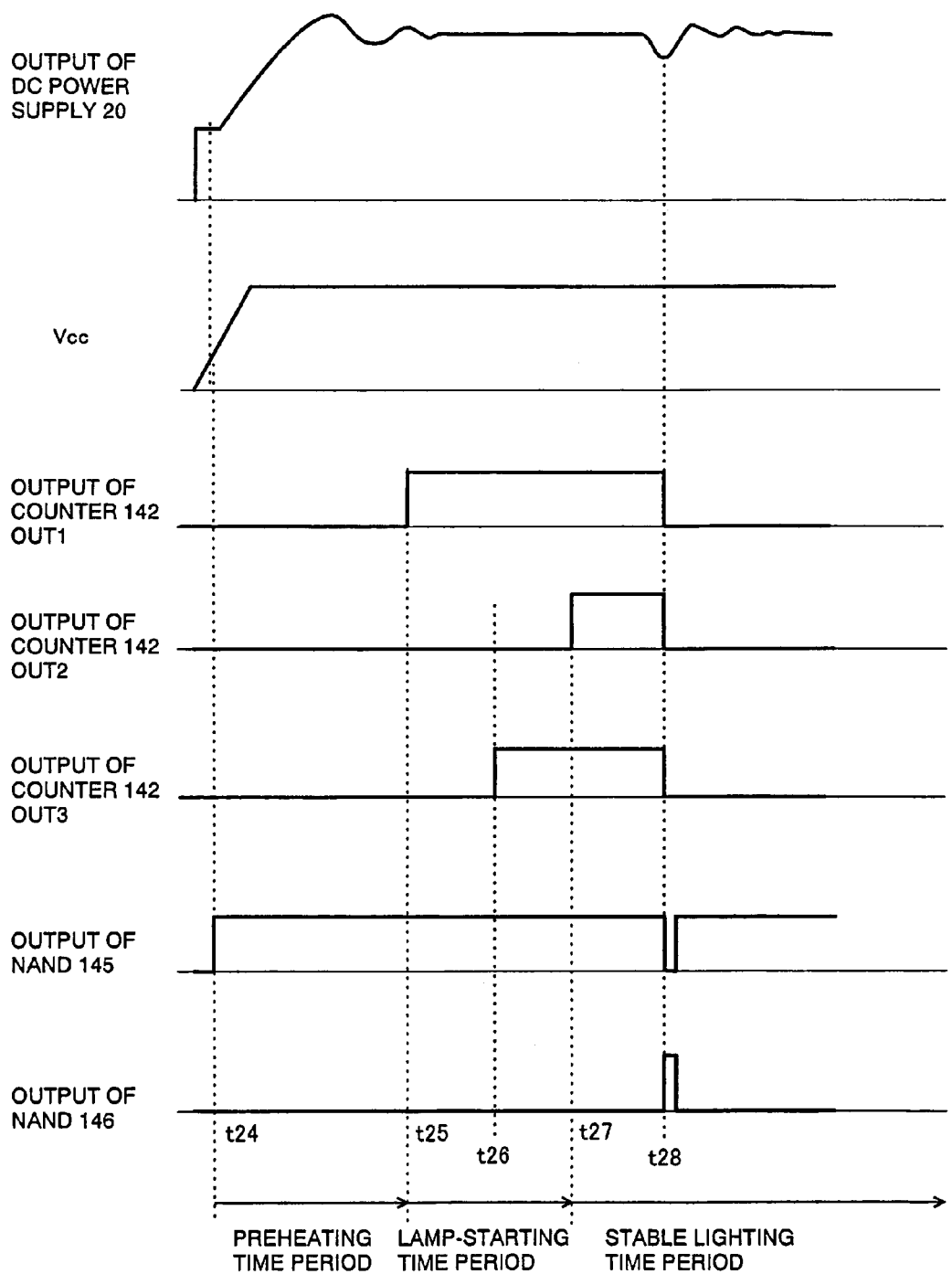
FIG. 22 is waveform charts for illustrating the operation of the above ballast.

The counter 142 of the first timer 140 has three output terminals OUT1, OUT2, and OUT3. As shown in FIG. 22, the counter 142 starts operating at time t24 at which the control voltage Vcc is provided to the integrated control circuit 100, and the outputs from the output terminals OUT1 and OUT2 are kept at L-level until time t25 to define the preheating time period. The output from the output terminal OUT1 is changed into H-level at the time t25 to define the lamp-start time period. The outputs from both of the output terminals OUT1, OUT2 become H-level at time t27 to define the stable lighting time period. Each of the time periods is recognized by the selector 150, and the second control unit 131 drives the switching elements of the inverter circuit 30 at a switching frequency corresponding to each of the time periods, in order to provide a current corresponding to each of the time periods to the discharge lamp. The counter 142 keeps the output terminal OUT3 at L-level until time t26 and keeps it at H-level after time t26. The time t26 is set up so that it is after the time t25 at which the lamp-start time period starts and before the time t27 at which the stable lighting time period starts (t25<t26<=t27).

Furthermore, the first timer 140 has a NAND gate 145, which receives the output from the comparator unit 281 of the second output limiter 280 and the output from the output terminal OUT3 of the counter 142, and has a NAND gate 146, which receives the output from the NAND gate 145 and the second inhibitor 260. The output of the NAND gate 146 is connected to the input terminal STOP of the counter 142. The output of the NAND gate 145 is inputted into AND gates 143, 144, together with the output of the output terminals OUT1, OUT2.

The comparator unit 281 of the second output limiter 280 provides a H-level output to the NAND gate 145 when the output from the DC power supply 20 is lower than the threshold Vth3, that is, when the output of the DC power supply 20 is insufficient, and The comparator unit 281 provides a L-level output to the NAND gate 145 when the output of the DC power supply is high enough. Because the output from the output terminal OUT3 of the counter 142 is kept at L-level until time t26 has elapsed, the output from the NAND gate 145 is kept at H-level regardless of the output from the comparator unit 281. And, at the time 25, the H-level output, which means the start of the lamp-start time period, is fed to the selector 150 through the AND gate 143 from the output terminal OUT1, and the inverter circuit 30 starts operating for the lamp-start time period. After the output of the output terminal OUT3 is changed into H-level at the time t26, the output from the NAND gate 145 is kept at H-level as long as the output from the comparator unit 281 is L-level, in other words, as long as the output from the DC power supply 20 is kept high enough. And, when the output terminal OUT2 of the counter 142 is changed into H-level at time t27, the lamp-start time period ends and the stable lighting time period starts.

As shown in FIG. 22, if the output of the DC power supply 20 drops at, for example, time t28 after the time t26 by some reason, the output from the comparator unit 281 becomes H-level, and then the output from the NAND gate 145 becomes L-level, and the output from the NAND gate 146 becomes H-level, and the counter 142 is reset, and the first time 140 sets up the preheating time period and the lamp-start time period again to restart the discharge lamp. Although the time t26<the time t27 (the start of the stable lighting time period) in FIG. 22, the time t27 at which the output from the output terminal OUT3 of the counter 142 is changed into H-level may be equal to the time t26 (t26=t27).

In addition, the output of the second inhibitor 260 is provided to the NAND gate 146, and when it is found that the input voltage to the DC power supply 20 is low over a predetermined time period, the input to the NAND gate 146 becomes L-level, and the counter 142 is reset by the NAND gate 146.

Figure 23:
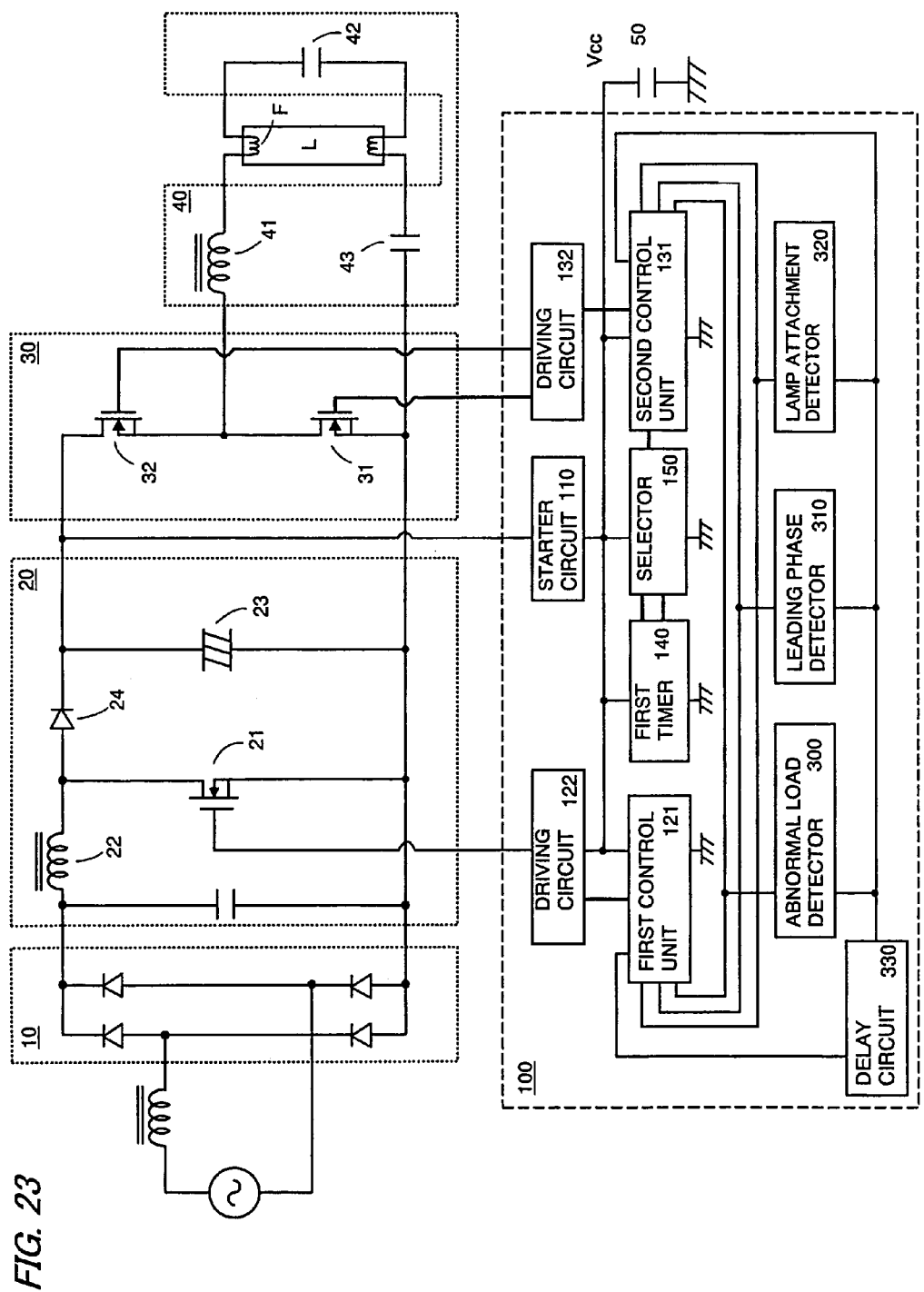
FIG. 23 is a circuit diagram of a ballast for a discharge lamp in accordance with a ninth embodiment of the present invention.

FIG. 23 shows a ballast for a discharge lamp in accordance with a ninth embodiment of the present invention. The ballast of this embodiment is identical to the ballast shown in FIG. 1 except that the integrated control circuit 100 further includes an abnormal load detector 300, a leading phase detector 310, a lamp attachment detector 320, and a delay circuit 330. So, the similar parts of these embodiments are identified by the same reference character and no duplicate explanation is made here.

The abnormal load detector 300 monitors the lamp voltage of the discharge lamp L and gives a directive to the first control unit 121 and the second control unit 131 to limit or stop the output of them when it recognizes that the lamp voltage indicates the abnormal condition of the discharge lamp.

The leading phase detector 310 monitors the resonant current flowing through the switching elements of the inverter circuit 30. When the switching elements 31, 32 are turned on and off at a frequency which is lower than the resonant frequency of the resonant circuit comprising the inductor 41 and the capacitor 42, and the leading phase current resulting from the unstable discharge state of the discharge lamp flows through the switching elements 31, 32, the leading phase detector 310 detects the leading phase current, and determines that the discharge lamp is abnormal, and then limits or stops the outputs of the DC power supply 20 and the inverter circuit 30.

The lamp attachment detector 320 detects whether the discharge lamp is attached to the lamp socket properly, and if it detects that the discharge lamp is not attached properly, the lamp attachment detector limits or stops the outputs of DC power supply 20 and the inverter circuit 30.

The delay circuit 330 delays an operation for releasing the restriction on the DC power supply 20 and the inverter circuit 30, when the abnormal load detector 300, the leading phase detector 310, and the lamp attachment detector 320 provide a release signal for releasing the restriction on the DC power supply 20 and the inverter circuit 30 after they give a directive to the DC power supply 20 and the inverter circuit 30 to restrict their operation, so as to detect the abnormal condition of the discharge lamp again during this delayed time period. Therefore, even if the releasing signal is issued accidentally by malfunction of the detection, the state of the discharge lamp is discriminated in the state where circuit parts suffer little stress. In this case, it is preferable that the second control unit 131 is reactivated first and subsequently the first control unit is reactivated.

Although the half bridge inverter circuit is illustrated in the above embodiments as the inverter circuit 30, the inverter circuit 30 is not limited to this and a full-bridge inverter circuit having two pairs of four switching elements may be used. In addition, if the switching frequency of the switching elements of the inverter circuit is given a correction which changes the switching frequency according to the environmental temperature, the output power of the inverter circuit can be controlled properly according to the ambient temperature. For example, if the oscillating frequency of the oscillator which determines the frequency of the switching element is given a positive temperature characteristic, that is, the oscillating frequency is given a correction which raises the frequency as the ambient temperature rises, the output of the inverter circuit 30 is increased when the temperature is low, and the output is reduced when the temperature is high, therefore an output power for keeping the light output at a constant value can be given to the discharge lamp.

Furthermore, it is also useful that the switching frequency of the DC power supply 20 is given a negative temperature characteristic, that is, the output of the DC power supply 20 is increased when the temperature is low and the output of the DC power supply is reduced when the temperature is high, and the DC power supply is controlled by feedback control according to the environmental temperature so as to provide for the change of the environmental temperature.

Although each embodiment explained the characteristic feature of the present invention for the sake of understanding, the present invention should not be limited to these embodiments, and should encompass any combination of the individual features.

The invention claimed is:

1. A ballast for a discharge lamp comprising:
   a DC power supply which receives an input voltage and provides a regulated DC output voltage, said DC power supply including a switching element which is driven to turn on and off in a controlled manner to provide said DC output voltage;
   an inverter circuit which converts said DC output voltage into a high frequency voltage, said inverter circuit including at least one pair of two switching elements which are connected in series across said DC output voltage and are controlled to alternately turn on and off to provide said high frequency voltage;
   a load circuit which receives said high frequency voltage to apply it to the discharge lamp for driving said discharge lamp; and
   an integrated control circuit which controls said switching elements of said DC power supply as well as said inverter circuit;
   wherein said DC power supply is a step-up chopper circuit for boosting the input voltage to said DC output voltage;
   wherein said load circuit including an inductor and a capacitor which are cooperative to form a resonant circuit through which said high frequency voltage is applied to said discharge lamp;
   wherein said integrated control circuit comprises:
   a first control unit which generates a first control signal for control of said switching element of said DC power supply,
   a second control unit which generates a second control signal for control of the switching elements of said inverter circuit,
   a driver circuit which provides drive signals for driving each one of the switching elements of said DC power supply and said inverter circuit in accordance with said first control signal and said second control signal,
   a starter circuit providing a controlled power for energizing said first control unit, said second control unit, and said driver circuit,
   a first timer which starts counting time upon energization of said first control unit, said second control unit, and said driver circuit so as to define a preheating time period within which filaments of the discharge lamp are heated, and to define a subsequent lamp-start time period within which a starting voltage is applied to the discharge lamp, and
   a selector which, in response to the output from said first timer, varies at least one of a duty ratio of and a switching frequency of the switching elements of said inverter circuit for providing a preheating current to said filaments within said preheating time period and for providing said starting voltage within said lamp-start time period.

2. The ballast as set forth in claim 1, further including a power input monitor which monitors an input voltage being fed to said DC power supply and provides an output indicative of the monitored input voltage,
   said integrated control circuit including:
   a comparator which compares said input voltage with a first threshold and enables said first timer, said first control unit, and said second control unit when said input voltage exceeds said threshold.

3. The ballast as set forth in claim 2, further including:
   a power output detector unit which detects said DC output voltage of said DC power supply,
   said first control unit operating to control the duty ratio of the switching elements of said DC power supply in accordance with the detected DC output voltage and the monitored input voltage for regulating said DC output voltage.

4. The ballast as set forth in claim 2, wherein
   said comparator compares said input voltage with a second threshold lower than said first threshold and provides a low-voltage indicating signal until said input voltage goes above said first threshold after it goes below said second threshold,
   a second inhibitor disabling said DC power supply and said inverter circuit when said low-voltage indicating signal continues over a predetermined reference time period.

5. The ballast as set forth in claim 4, wherein
   said integrated control circuit includes a second output limiter which provides a second limit signal when said detected output voltage goes below a threshold, said second limit signal causing said second control unit to lower the output of said inverter circuit,
   said second limit signal from said second output limiter being invalidated during a time period starting from said beginning of said lamp-start time period and ending at a time equal to or earlier than the end of said lamp-start time period.

6. The ballast as set forth in claim 4, wherein
   said integrated control circuit includes oscillators generating a clock signal,
   said first timer and said first inhibitor include counters which count the number of the clock signal assigned respectively to said first timer and said second inhibitor to define said preheating time period, said lamp-starting time period, and said reference time period.

* * * * *